United States Patent [19]

Kawada et al.

[11] Patent Number: 5,504,590
[45] Date of Patent: Apr. 2, 1996

[54] COMMUNICATION SYSTEM FOR MANAGING DATA OF RESOURCES OF IMAGE FORMING UNIT

[75] Inventors: Yasuo Kawada, Kawasaki; Hidenori Sakai, Hiratsuka; Makoto Obu, Kanagawa; Katsuhiro Echigo, Saitama; Yasuhiro Kawashima, Tokyo; Hidetoshi Yano; Fumio Kishi, both of Yokohama, all of Japan

[73] Assignee: Ricoh Company, Ltd., Tokyo, Japan

[21] Appl. No.: 379,018

[22] Filed: Jan. 27, 1995

Related U.S. Application Data

[63] Continuation of Ser. No. 264,160, Jun. 22, 1994, abandoned.

[30] Foreign Application Priority Data

Jun. 25, 1993 [JP] Japan ..................... 5-155697

[51] Int. Cl.$^6$ ..................... H04N 1/00
[52] U.S. Cl. ............... 358/403; 358/406; 355/204
[58] Field of Search ..................... 358/400, 403, 358/406, 442, 444, 501, 504; 355/203, 204, 205, 208; 379/100; H04N 1/00

[56] References Cited

U.S. PATENT DOCUMENTS 5,212,776  5/1993  Zandveld et al.
5,223,896  6/1993  Shimizu et al. .................. 355/208

FOREIGN PATENT DOCUMENTS 2-265396  10/1990  Japan .
3-226768  10/1991  Japan .
4-70765   3/1992  Japan .
4-318866  11/1992  Japan .

Primary Examiner—Edward L. Coles, Sr.
Assistant Examiner—Kim Yen Vu
Attorney, Agent, or Firm—Popham, Haik, Schnobrich & Kaufman, Ltd.

[57] ABSTRACT

A communication system includes: an image forming unit connected to a communication line through a communication control unit; and a management unit for managing data of resources of the image forming unit, the management unit being connected to the communication line, the image forming unit including: at least one component part; a first storage part for storing a control program for the component part, so that the component part is controlled in accordance with the control program; and a first control part for transmitting a first code to the management unit via the communication line in response to an update request signal, the first code indicating a model of the image forming unit and indicating a type of the component part, the management unit including: a second storage part for storing a plurality of control programs for different types of the component part of the image forming unit; and a second control part for reading out a first control program from the second storage part in accordance with the first code received from the first control part, and for transmitting the first control program to the image forming unit via the communication line, so that the first control program is stored in the first storage part.

9 Claims, 21 Drawing Sheets

YOU ARE CHARGED FOR PROGRAM UPDATE

FIG. 25

PRESS ITEM NUMBER

☐ 1   BASIC PROGRAM

☐ 2   APPLICATION PROGRAM #1

☐ 3   APPLICATION PROGRAM #2

☐ 4   ---

COMMUNICATION SYSTEM FOR MANAGING DATA OF RESOURCES OF IMAGE FORMING UNIT

This is a continuation of U.S. patent application Ser. No. 08/264,160, filed Jun. 22, 1994 now abandoned.

BACKGROUND OF THE INVENTION

The present invention generally relates to a communication system, and more particularly to a communication system for managing data of resources of an image forming unit, such as a copier, a printer, or a facsimile machine, in the communication system.

An image forming device is made up of various component parts including electronic parts, metal parts and plastic parts. When one of the component parts of the image forming device malfunctions or when an operating life of one of the component parts of the image forming device is reached, only that component part can be changed with a new component part, and it is not necessary to change the image forming device with a new image forming device. Thus, resources of the image forming device can be efficiently used.

In conventional image forming devices, it is difficult to efficiently re-use a component part, detached from one image forming device, in another image forming device. Generally, in order to control an operation of the component part in a source image forming device, it is necessary that the source image forming device has a control program suitable for controlling the operation of the component part. Thus, in order to efficiently re-use the component part, detached from the source device, in the new device, it is necessary that the new device has a control program suitable for controlling the operation of the component part. If the control program of the new device does not suit the component part, the operation of the component part cannot be efficiently controlled on the new device.

It is desirable to allow the component part, detached from the source image forming device, to be efficiently re-used for another image forming device, in order to promote environmental protection and resource saving.

Since new image forming devices are increasingly put into practical use at the times of model changes, it is desirable to allow a component part, detached from an image forming device of a previous model, to be efficiently used for a different image forming device of the new model. However, it is likely that a control program of the new model does not suit the component part of the previous model. Thus, there is a problem with the conventional image forming devices in that it is impossible to efficiently re-use the component parts, detached from the previous model, for the new model.

SUMMARY OF THE INVENTION

Accordingly, it is a general object of the present invention to provide a novel and useful communication system in which the above described problem is eliminated.

Another, more specific object of the present invention is to provide a communication system including an image forming unit and a management unit, connected to the image forming unit via a communication line for managing data of resources of the image forming unit, which system enables a control program for a component part, detached from a different image forming unit, to be updated with a new control program supplied from the management unit, thereby allowing the component part to be efficiently re-used for the image forming unit.

The above mentioned objects of the present invention are achieved by a communication system which includes: an image forming unit connected to a communication line through a communication control unit; and a management unit for managing data of resources of the image forming unit, the management unit being connected to the communication line, the image forming unit including: at least one component part; a first storage part for storing a control program for the component part, so that the component part is controlled in accordance with the control program; and a first control part for transmitting a first code to the management unit via the communication line in response to an update request signal, the first code indicating a model of the image forming unit and indicating a type of the component part, the management unit including: a second storage part for storing a plurality of control programs for different types of the component part of the image forming unit; and a second control part for reading out a first control program from the second storage part in accordance with the first code received from the first control part, and for transmitting the first control program to the image forming unit via the communication line, so that the first control program is stored in the first storage part.

According to the present invention, it is possible to update a control program for a component part, detached from a different image forming unit, with a new control program supplied from the management unit. As the component part can be controlled in accordance with the new control program on the image forming unit, the component part can be efficiently re-used for the image forming unit, in order to promote environmental protection and resource saving.

BRIEF DESCRIPTION OF THE DRAWINGS

The above and other objects, features and advantages of the present invention will be more apparent from the following detailed description when read in conjunction with the accompanying drawings in which:

FIG. 25 is a diagram showing an example of a control program list which is transmitted by the management unit in the eighth embodiment.

DESCRIPTION OF THE PREFERRED EMBODIMENTS

A description will now be given of a communication system to which the present invention is applied.

Figure 1:
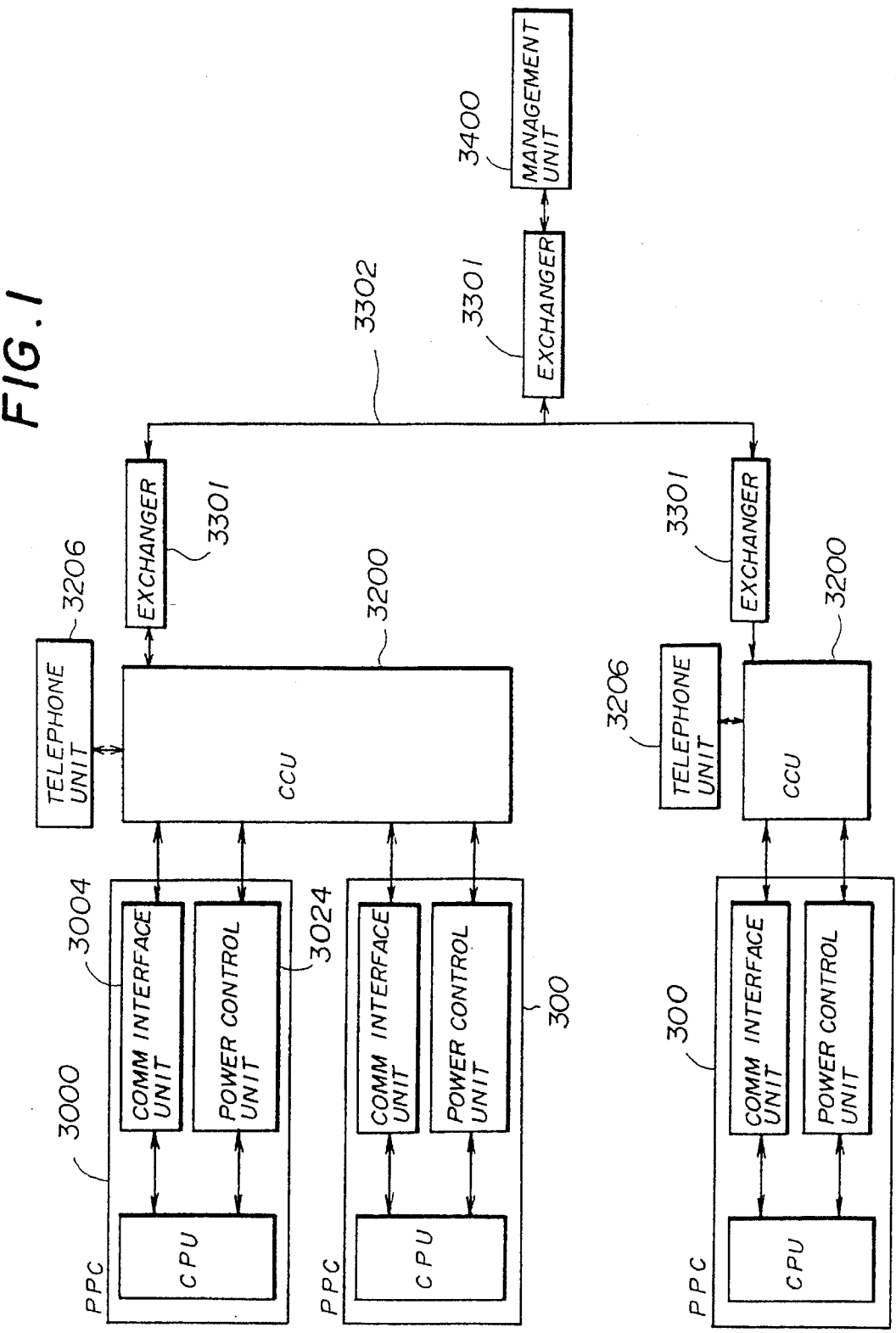
FIG. 1 is a block diagram showing a communication system to which the present invention is applied.

FIG. 1 shows a communication system to which the present invention is applied. In FIG. 1, one or a plurality of copiers 300 are installed on user locations. The copiers 300 are, for example, plain paper copiers (PPC). One or a plurality of copiers 300 are connected to a communication control unit (CCU) 3200. A plurality of CCUs 3200 are connected to the communication system, each CCU 3200 being connected to an exchanger 3301 and to a telephone unit 3206. The copier 300 have individual identifier codes and individual equipment lists.

A management unit 3400 is installed on a center location which is remote from the user locations. The management unit is connected to an exchanger 3301. The CCUs 3200 on the user locations are connected to the management unit 3400 on the center location through a telephone line 3302.

In an upload mode of the communication system in FIG. 1, data from one of the copiers 300 is sent to the management unit 3400 via the telephone line 3302. Before the data is transmitted to the management unit 3400, an identifier code and an equipment list of the copier 300 are transferred from the copier 300 to the CCU 3200. After the CCU 3200 is connected to the management unit 3400 via the telephone line 3302, the CCU 3200 transmits the identifier and the equipment list to the management unit 3400.

In a download mode of the communication system in FIG. 1, management data from the management unit 3400 is sent to one of the copiers 300 via the telephone line 3302. After the management unit 3400 is connected to the CCU 3200 via the telephone line 3302, the management unit 3400 transmits an identifier code, a control code and control data to the CCU 3200 prior to transmission of the management data. If the control code received accords with the control code of the CCU 3200, the CCU 3200 performs a procedure based on the identifier code, the control code and the control data received from the management unit 3400. The CCU 3200 transfers the control code and the control data to a copier 300 having the same identifier code as the received identifier code. After the copier has received the control code and the control data, the copier 300 performs a procedure based on the control code and the control data.

Figure 2:
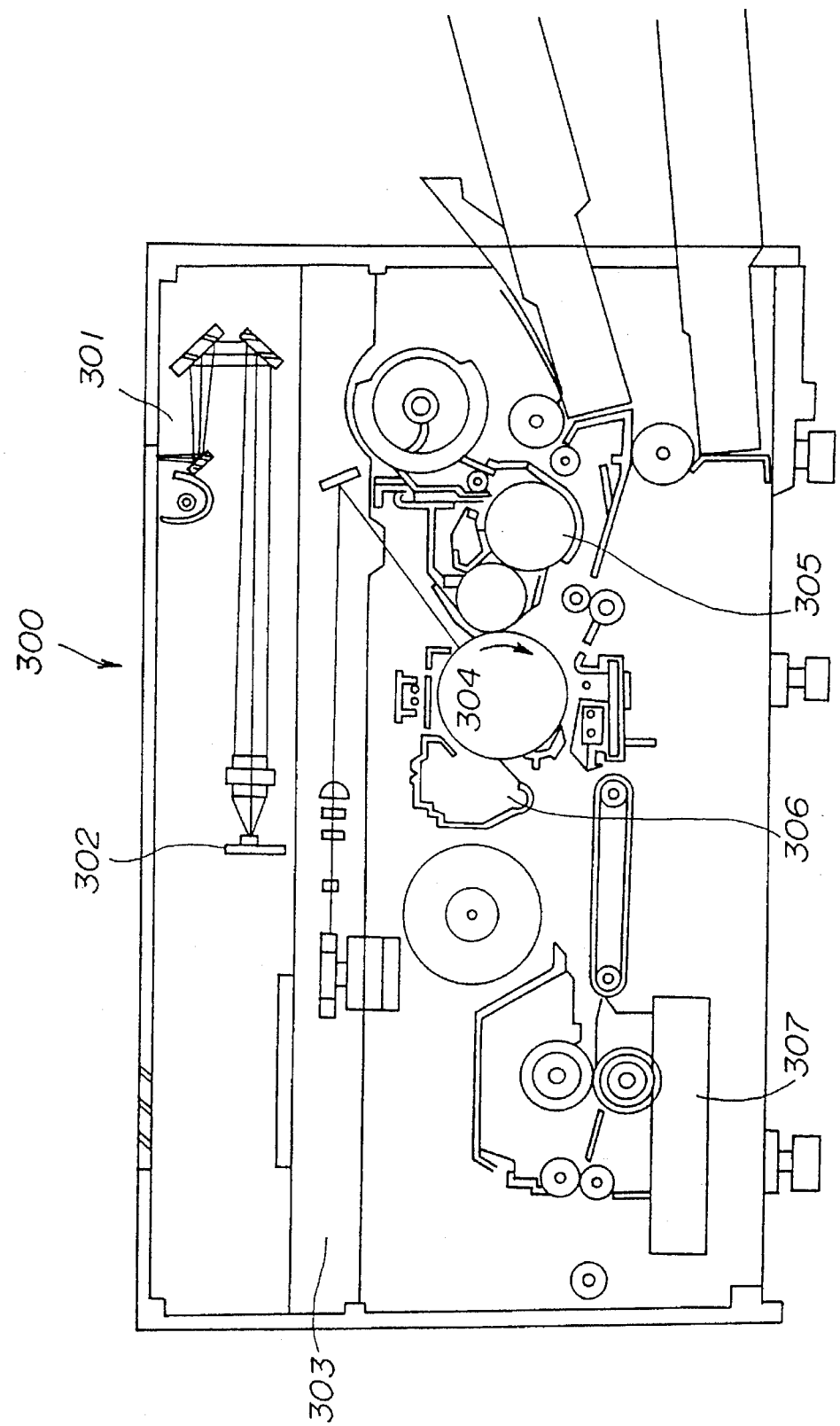
FIG. 2 is a sectional view showing a copier which is connected to the communication system in FIG. 1.

FIG. 2 shows a copier of the communication system in FIG. 1. In FIG. 2, the copier 300 is an electrophotographic digital copier of a plain paper type. A scanner 301 optically reads an image from a document, and a charged coupled device (CCD) 302 photoelectrically converts the image, read by the scanner 301, into an image signal. The image signal supplied from the CCD 302 is processed by an image processing part (not shown in FIG. 2).

In the copier 300 in FIG. 2, a laser writing unit 303 forms an electrostatic latent image on a photosensitive drum 304 by radiating a laser beam to the photosensitive drum 304 in accordance with the processed image signal from the image processing part.

In a known copier, an electrostatic charger, a developing unit, a transfer charger, and a cleaning unit, which are necessary to carry out an electrophotographic image forming process, are arranged around the photosensitive drum. Also, a paper feeding unit and a fixing unit are arranged on the known copier. In order to produce a copy with good image quality, it is necessary that the parts of the copier mentioned above are controlled in the electrophotographic image forming process by setting various conditions and detecting various pieces of data.

In FIG. 2, a developing unit 305, a cleaning unit 306 and a fixing unit 307 are arranged in the copier 300 for use in the electrophotographic image forming process. These parts can be detached from the copier 300 and re-used in a different copier.

Figure 3:
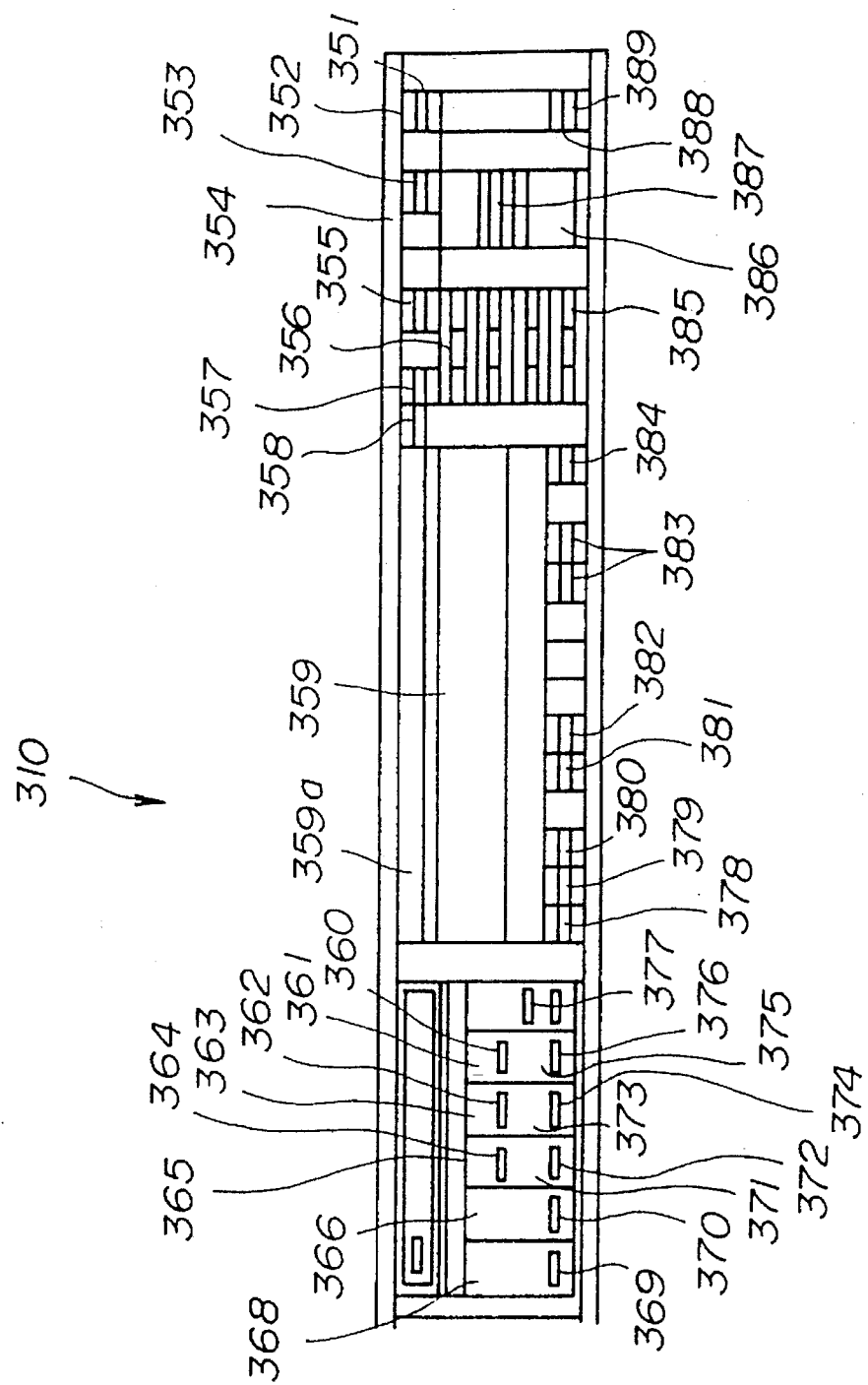
FIG. 3 is a plan view showing an operational panel of the copier in FIG. 2.

FIG. 3 shows an operational panel of the copier in FIG. 2. An operational panel 310 in FIG. 3 is separately provided on and attached to the main body of the copier 300. The operational panel 310 is detachable from the main body of the copier 300.

On the operational panel 310 in FIG. 3, a timer key 351, a timer indicator 352, a program key 353, a program indicator 354, an enter key 355, a set of numeric keys 356, a guidance key 357, a guidance key indicator 358, a display panel 359, a guidance display portion 359a, a size enlarge/reduce key 360, a size enlarge/reduce indicator 361, a centering key 362, a centering indicator 363, a staple margin adjust key 364, a staple margin indicator 365, a two-sided copy indicator 366, and a remote message indicator 368 are arranged from the right top corner to the left top corner. On the other hand, from the left bottom corner to the right bottom corner of the operational panel 310, a remote message key 369, a two-sided copy key 370, a page-successive copy indicator 371, a page-successive copy key 372, a delete indicator 373, a delete key 374, a paper-specific enlarge/reduce indicator 375, a paper-specific enlarge/reduce key 376, a zoom enlarge/reduce key 377, a reduce key 378, an enlarge 379, a non-magnify key 380, a paper select key 381, an automatic paper select key 382, a density adjust key 383, an automatic density key 384, a clear/stop key 385, a start key 386, an interrupt key 387, a preheat indicator 388, and a mode-clear/preheat key 389 are arranged.

Figure 4:
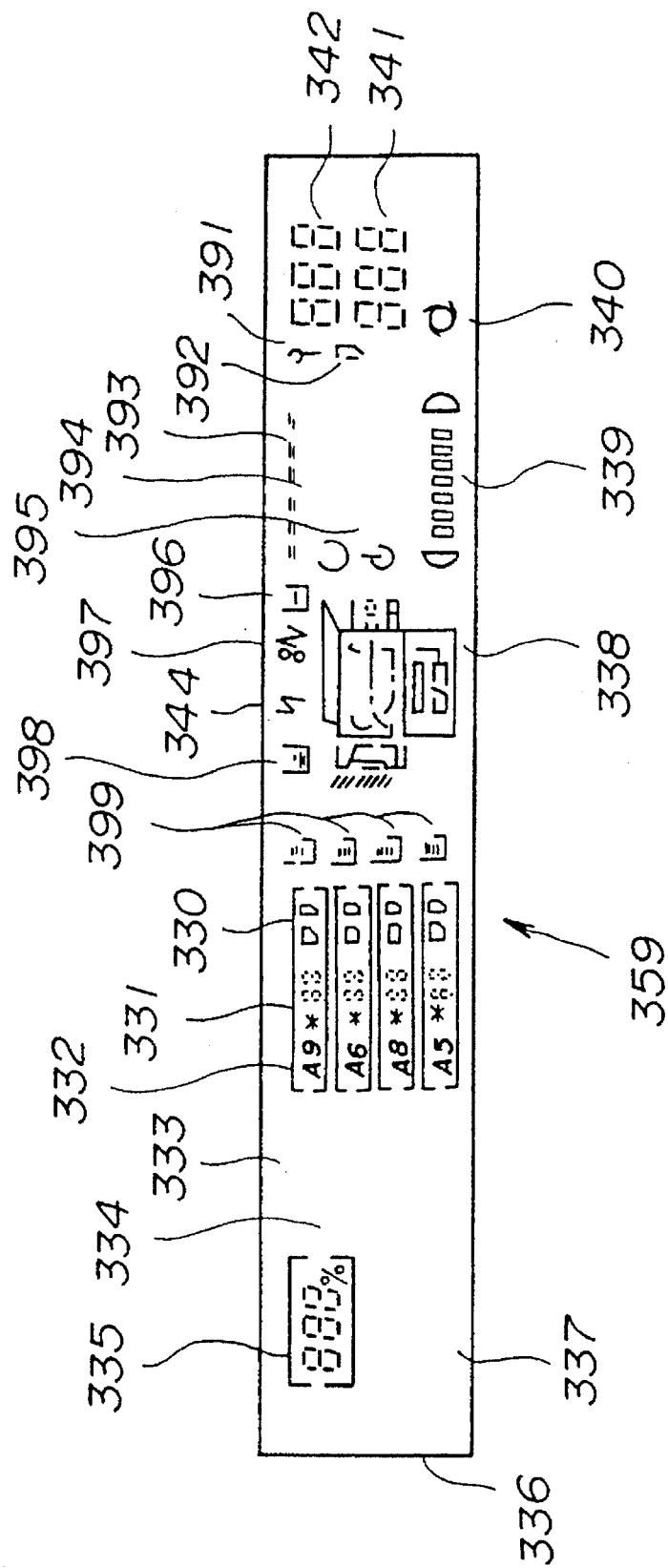
FIG. 4 is a plan view showing a display panel of the operational panel in FIG. 3.

FIG. 4 shows a display panel of the operational panel 310 in FIG. 3. From the left portion to the right portion on the display panel 359 in FIG. 4, a non-magnify indicator 336, a zoom enlarge/reduce indicator 337, a magnification factor display 335, an automatic paper select indicator 333, a paper-specific enlarge/reduce indicator 334, paper direction indicators 330, paper size indicators 331, paper select indicators 332, paper supply indicators 399, a toner end indicator 398, a remote message warning indicator 344, a mis-feed indicator 397, a paper end indicator 398, a mis-feed position indicator 338, a waiting state indicator 395, a ready state indicator 394, a running state indicator 393, a manual feed indicator 392, a maintenance call indicator 391, a density adjust indicator 339, an automatic density indicator 340, a copy number display 342, and a set number display 341 are arranged.

The indicators and displays of the operational panel 310 and the indicators and displays of the display panel 359 are made from light emitting diodes (LEDs) or liquid crystal displays (LCDs).

The operational panel and the display panel of the copier 300 according to the present invention are not limited to the above described operational panel 310 and the display panel 359 in FIGS. 3 and 4. There are different operational panels which may be attached to the copier 300. For example, an operational panel 410 shown in FIG. 5 or an operational panel 510 shown in FIG. 6 may be attaches to the copier 300.

Figure 5:
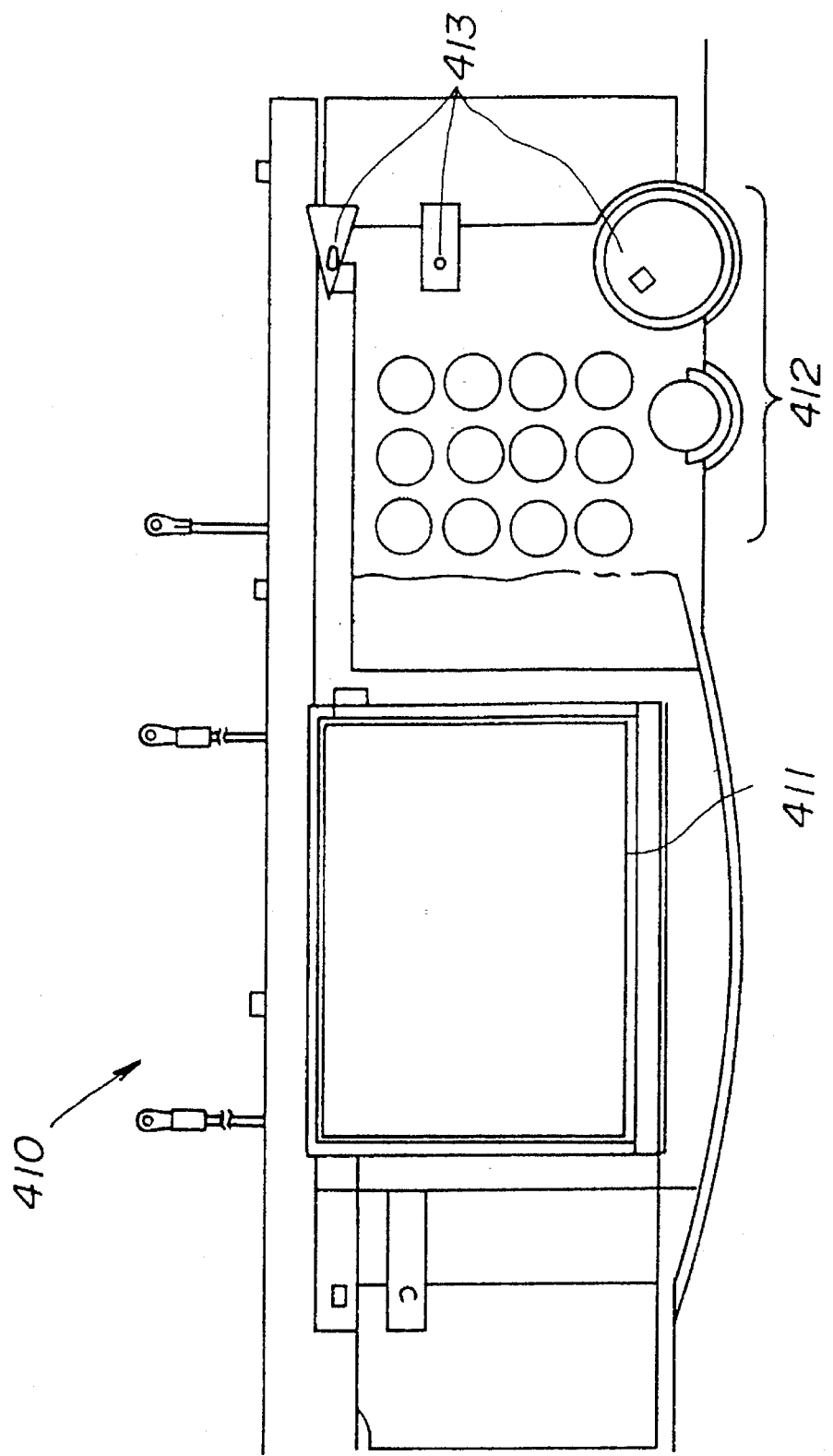
FIG. 5 is a plan view showing another operational panel which can be attached to the copier in FIG. 2.

On the operational panel 410 in FIG. 5, a touch panel display 411, a set of keys 412, and a set of LED indicators 413 are arranged. The touch panel display 411 is made of full-dot type LCDs, and a key-in area and a message are displayed on the touch panel display 411. An operator can input a selection command by touching the touch panel display 411. The keys 412 are a depressed type, and some of the keys 412 are provided with the LED indicators 413. Each of the LED indicators 413 indicates that the related key is depressed.

Figure 6:
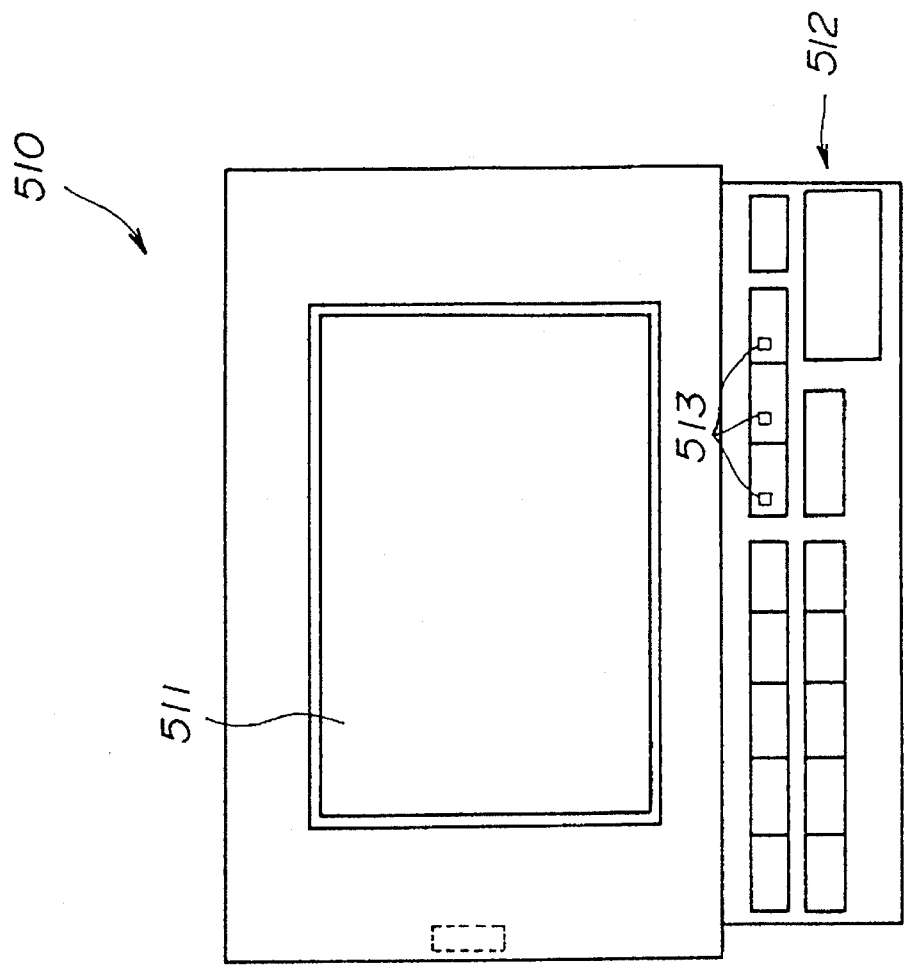
FIG. 6 is a plan view showing still another operational panel which can be attached to the copier in FIG. 2.

On the operational panel 510 in FIG. 6, a combined touch panel display 511, a set of keys 512, and a set of LED indicators 513. The touch panel display 511 is a combination of a cathode ray tube (CRT) display and a touch panel display, and it is used to input a selection command, to display an operational message, and to display an error message. The keys 512 are a depressed type, and some of the keys 512 are provided with the LED indicators 513. Each of the LED indicators 513 indicates that the related key is depressed.

Figure 7:
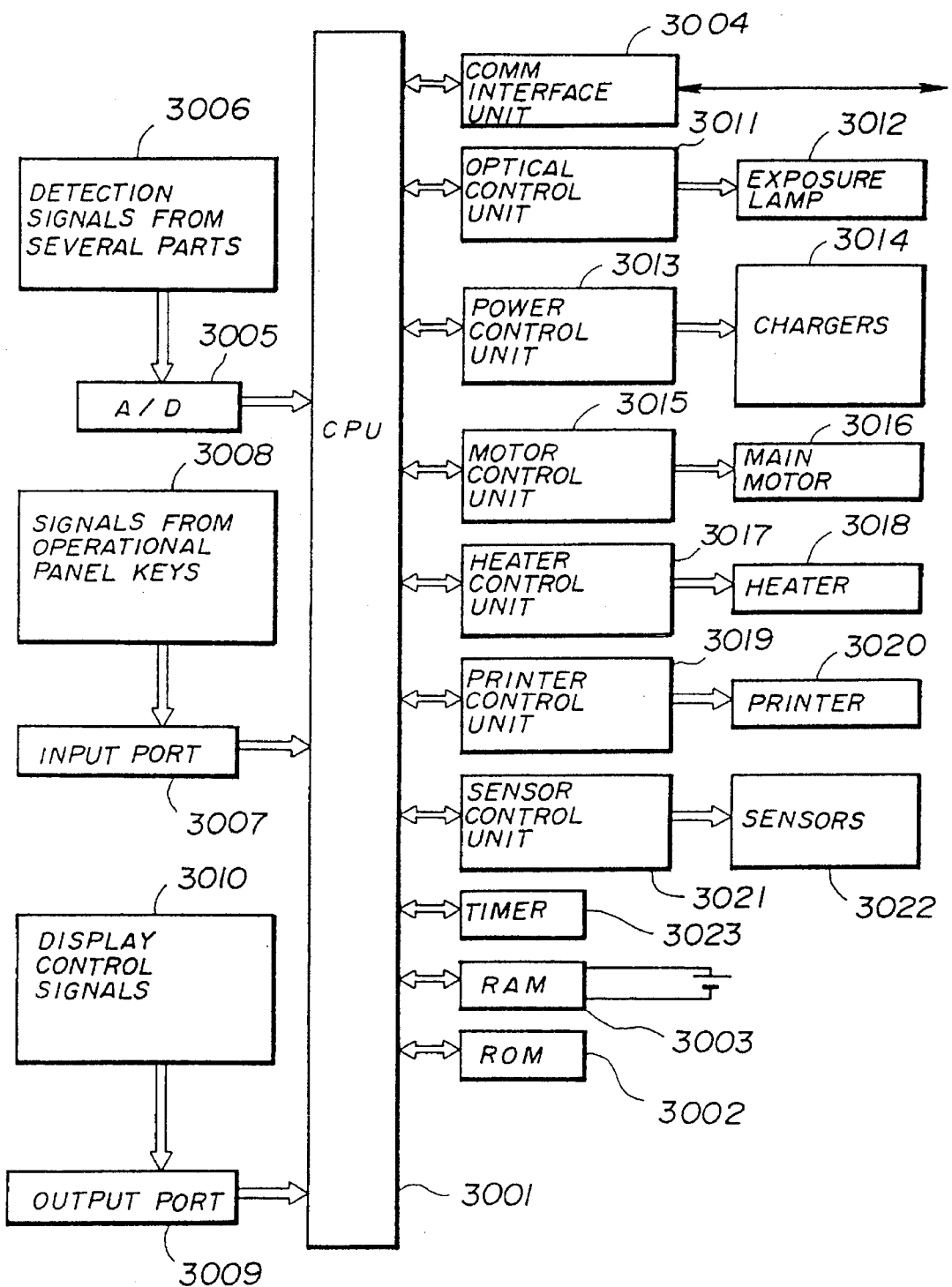
FIG. 7 is a block diagram showing a control part of the copier in FIG. 2.

FIG. 7 shows a control part of the copier 300 in FIG. 2. The parts of the copier 300 are operated under the control of a central processing unit (CPU) 3001. A basic system program and the related data are stored in a read only memory (ROM) 3002. A random access memory (RAM) 3003 is provided with a battery, and it is a backup RAM. Control programs for controlling the parts including the operational panel are stored in the RAM 3003, and intermediate data is temporarily stored in the RAM 3003. A communication interface unit 3004 is used to transfer data of the copier 300 to the CCU 3200 in FIG. 1, and used to receive the control code and the control data from the CCU 3200.

An analog-to-digital (A/D) converter 3005 in FIG. 7 converts several detection signals 3006, output from several parts of the copier 300, into digital signals. The digital signals are input to the CPU 3001. The detection signals 3006 include a lamp voltage of the scanner 301, a light emission voltage of a toner density control sensor, a reception light voltage of the toner density control sensor, an output voltage of a potential detecting sensor of the photosensitive drum 302, a voltage of an automatic density adjust sensor of the developing unit, a voltage of a light quantity sensor of the scanner 301, a voltage of a current sensor of the photosensitive drum 302, and a thermistor voltage of the fixing unit. The copying operation of the copier 300 is inhibited when a measured fixing temperature based on the thermistor voltage of the fixing unit is detected to be lower than a reference temperature.

An input port 3007 in FIG. 7 supplies signals 3008, output from the keys of the operational panel 310 in FIG. 3 and from other sensors or switches, to the CPU 3001. The signals 3008 include output signals of the keys of the operational panel 310 and an output signal of a remote message dip switch on the copier 300. When the remote message dip switch is turned on after the power of the copier 300 is on, a remote communication procedure is started with the management unit 3400. When the remote message dip switch is turned off, the remote communication procedure is not performed.

An output port 3009 in FIG. 7 supplies display control signals 3010 to the displays and indicators of the operational panel 310 and the display panel 359. An optical control unit 3011 controls an exposure lamp 3012 of the scanner 301. A high-voltage power control unit 3013 supplies power to several chargers 3014 including the electrostatic charger, the transfer charger, a pre-transfer charger, and the developing unit. A motor control unit 3015 controls a main motor 3016. A heater control unit 3017 controls a heater 3018 of the fixing unit. A printer control unit 3019 outputs management data for the copier 300, to a printer 3020. The printer 3020 is an image forming part of the copier 300. A sensor sensitivity control unit 3021 controls the reception light gains of several sensors 3022, including the toner density control sensor, and controls the light emission voltage of the toner density control sensor. A timer 3023 measures the current time, and is used to activate the a.c. power supply of the copier 300 at fixed intervals of time.

Figure 8:
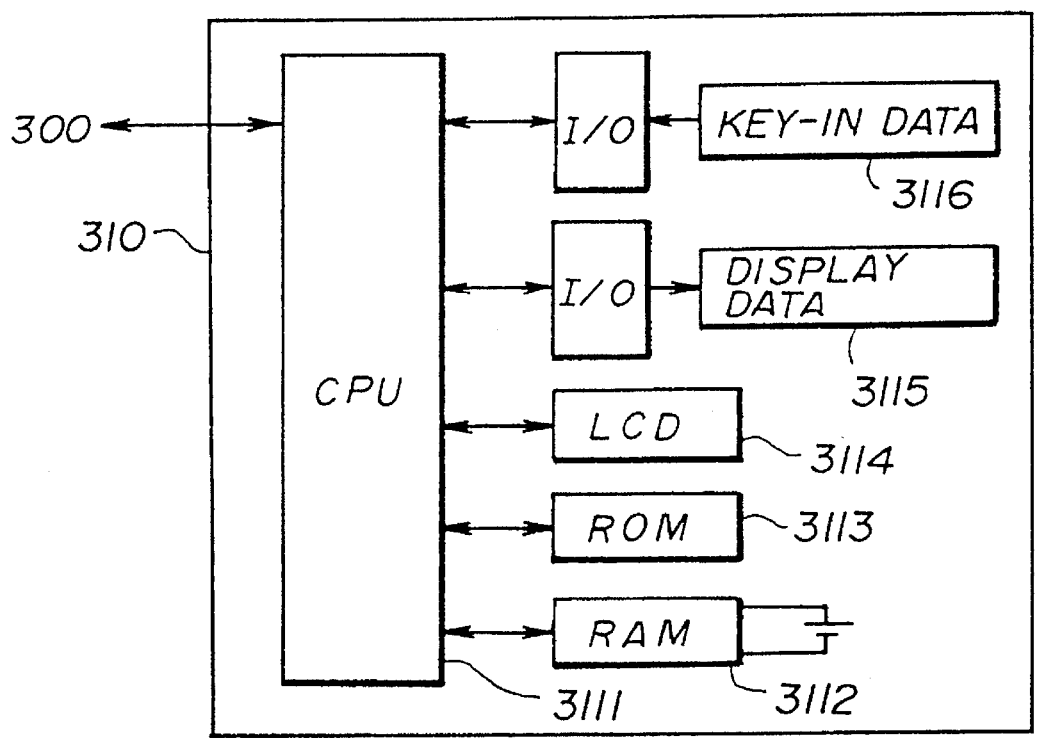
FIG. 8 is a block diagram showing a control part of the operational panel in FIG. 3.

FIG. 8 shows a control part of the operational panel in FIG. 3. In FIG. 8, a control program for controlling the operational panel 310 is stored in a RAM 3112, and the related display control data is stored in a ROM 3113. The operational panel 310 is controlled by a CPU 3111 in accordance with the control program stored in the RAM 3112. When a key-in data 3116 is input from the operational panel 310, the CPU 3111 reads out a display control code, related to the key-in data, from the ROM 3113 in accordance with the control program in the RAM 3112, and displays a character corresponding to the display control code on a LCD 31114.

Figure 9:
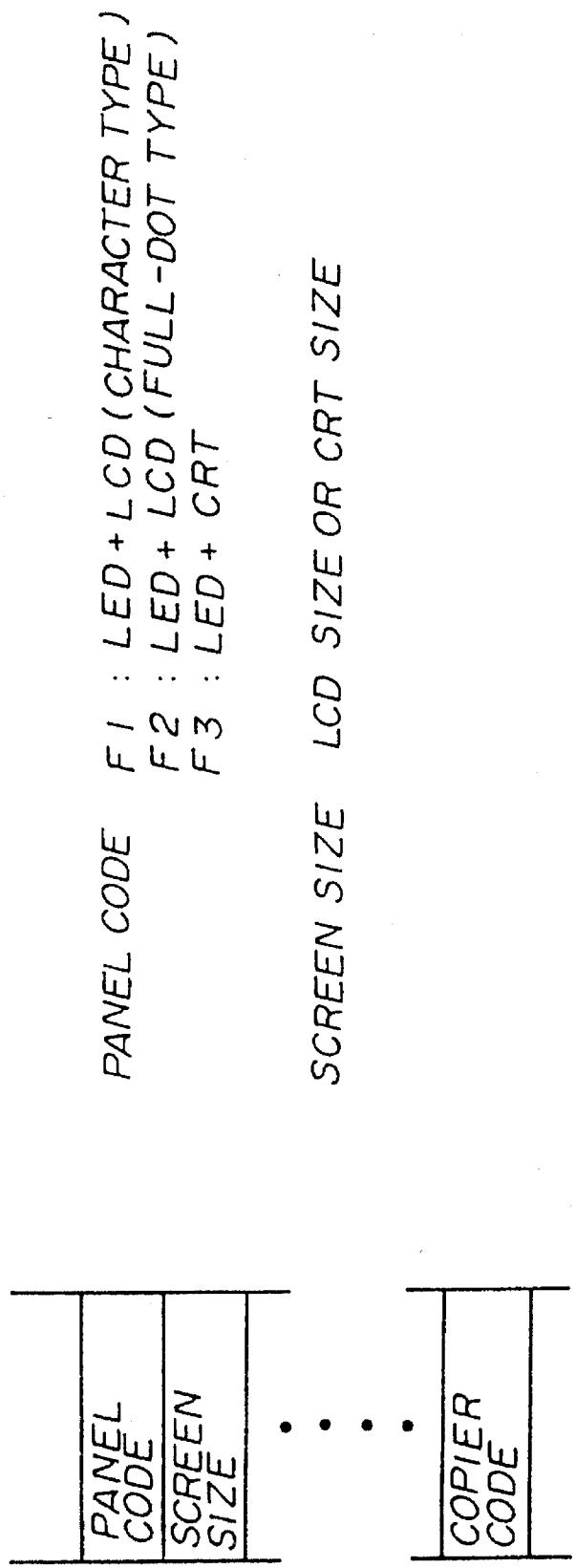
FIG. 9 is a diagram for explaining an operational panel code used for the operational panel in FIG. 3.

In the ROM 3113 in FIG. 8, an operational panel code, which is used to notify the type of the operational panel 310, is stored. FIG. 9 shows an example of the operational panel code. The operational panel code, as shown in FIG. 9, comprises a panel code indicating the type of the operational panel, a screen size indicating the size of the display screen, and a copier code indicating the type of copiers to which the operational panel can be attached. One of various types of operational panels is set to the panel code of the operational panel code. For example, in the above described embodiment, "F1" indicates an operational panel having a character type LED + LCD display, "F2" indicates an operational panel having a full-dot type LED + LCD display, and "F3" indicates an operational panel having an LCD + CRT display. The screen size is the size of an LCD or LED display screen.

It is possible that the operational panel code described above is stored in the RAM 3112, instead of the ROM 3113.

Figure 10:
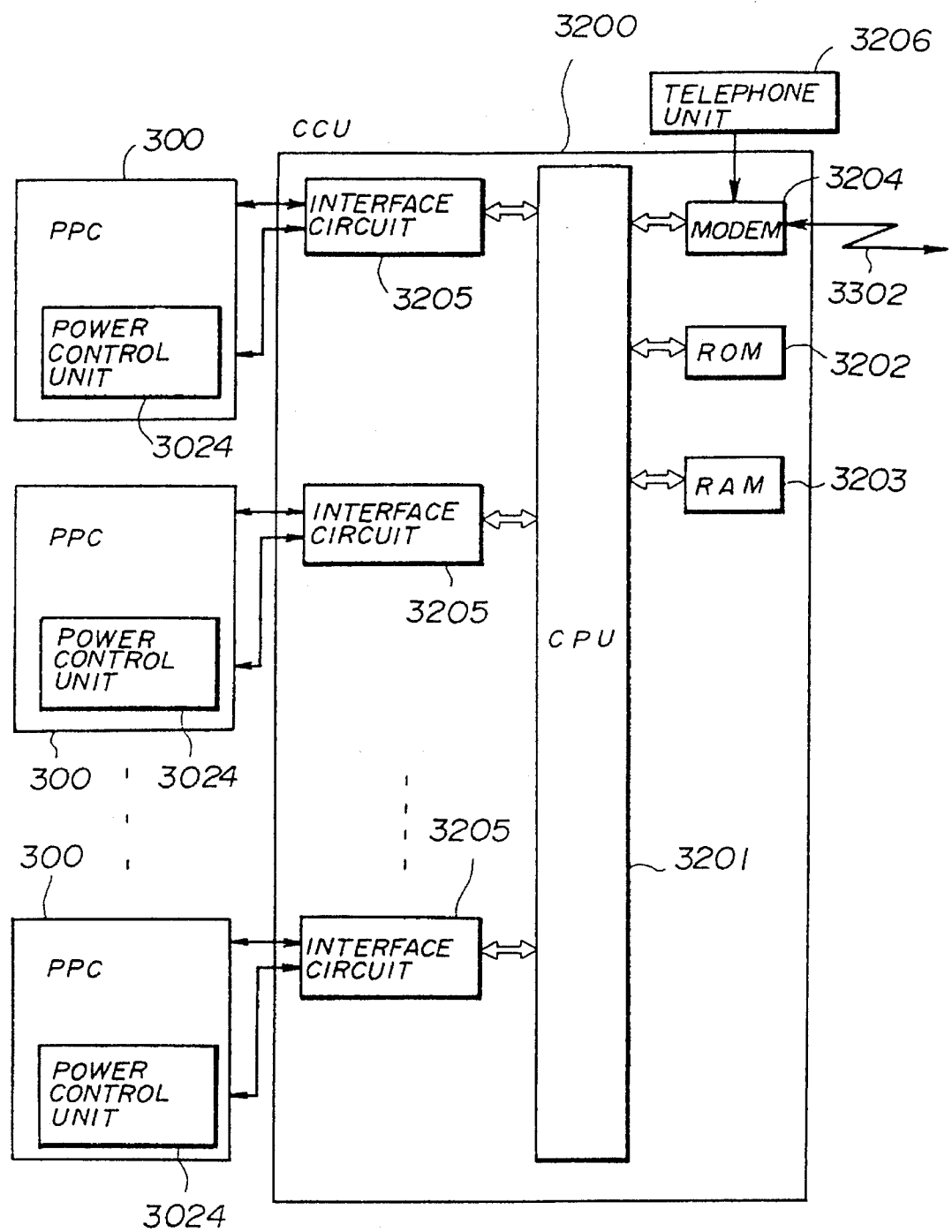
FIG. 10 is a block diagram showing a communication control unit which is connected to the communication system in FIG. 1.

FIG. 10 shows a communication control unit (CCU) 3200 which is connected to the communication system in FIG. 1. The CCU 3200 is operated under the control of a CPU 3201 in FIG. 10. In FIG. 10, a control program for controlling the CCU 3200, and the related control data are stored in a ROM 3202. The CCU 3200 is controlled by the CPU 3201 in accordance with the control program and the related control data in the ROM 3202. Intermediate data is temporarily stored in a RAM 3203.

In FIG. 10, the CCU 3200 includes a modem 3204 and a plurality of interface circuits 3205. The modem 3204 is used to transmit data from one of the plurality of copiers 300 to the management unit 3400 via the telephone line 3302, and is used to receive data from the management unit 3400 via the telephone line 3302. As the CCU 3200 has the plurality of interface circuits 3205, a plurality of copiers 300 can be attached to the CCU 3200 through the interface circuits 3205. The interface circuits 3205 are used to transfer data from the copiers 300 to the CPU 3201 and used to transfer data from the CPU 3201 to the copiers 300. A telephone unit 3206 can be attached to the modem 3204.

The CCU 3200 in FIG. 10 transmits management data (such as an operational panel code) from one of the copiers 300, to the management unit 3400 via the telephone line 3302. The CCU 3200 receives the control code and the related control data from the management unit 3400 via the telephone line 3302, and transmits the control code and the control data to one of the copiers 300. The CCU 3200 supplies a control signal to one of the copiers 300 to activate the power control unit 3024 of the copier. The CCU 3200 can identify each of the copiers 300 which are connected to the CCU 3200. When two or more copiers 300 transmit data to the CCU 3200 at the same time, the CCU 3200 transmits the data from one copier and temporarily stores the data from the other copiers until the transmission of the data from the above mentioned copier is completed. The CCU 3200 switches a communication path between the CCU 3200 and the management unit 3400 into a communication path between the CCU 3200 and a telephone unit 3206 (which is connected to the modem 3204), and switches them vice versa.

Figure 11:
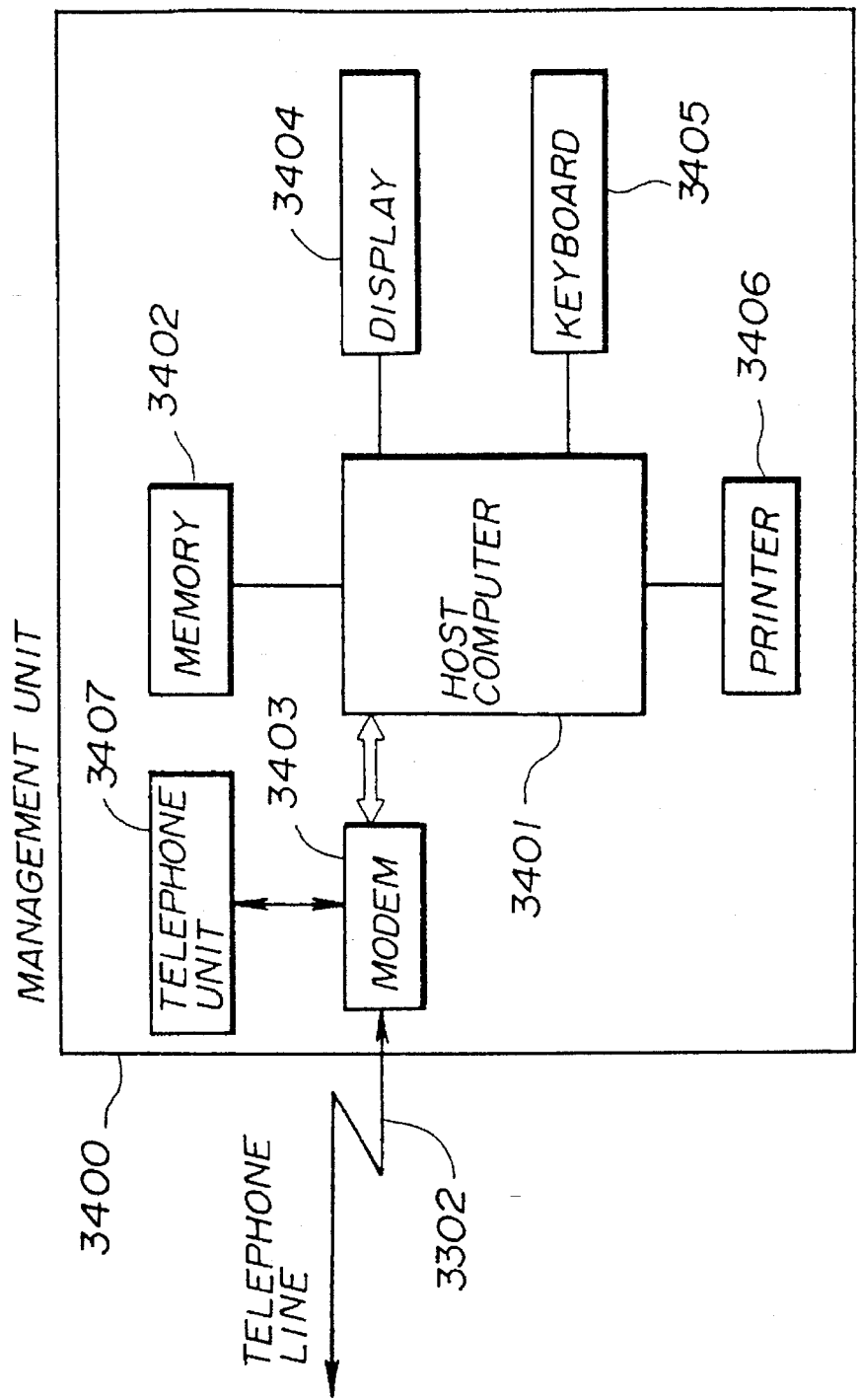
FIG. 11 is a block diagram showing a management unit which is part of the communication system in FIG. 1.

FIG. 11 shows a management unit which is connected to the communication system in FIG. 1. In FIG. 11, the management unit 3400 comprises a host computer 3401, a memory 3402, a modem 3403, a display 3404, a keyboard 3405, a printer 3406, and a telephone unit 3407. The host computer 3401 carries out various procedures. Various control programs for controlling operational panels of different types are stored in the memory 3402, and the operational panels are designed in accordance with the models of the copier. The modem 3403 is used to transmit data from the management unit 3400 to the CCU 3200 via the telephone line 3302, or to receive data from the CCU 3200 via the telephone line 3302. Each of the control programs, stored in the memory 3402, is in accordance with the model of the copier to which the operational panel can be attached.

Next, a description will be given of a control program update procedure which is performed by the communication system in a first embodiment of the present invention.

By performing the control program update procedure in the first embodiment, the previous control program is updated with a new control program received from the management unit 3400. For the sake of convenience, it is assumed that an operational panel 310, detached from the previous copier (not shown), is attached, before the control program update mode is performed, to the copier 300 to re-use the operational panel 310 thereon. When an update request key of the operational panel 310 of the copier 300 is turned ON, the control program update mode is started.

Figure 12:
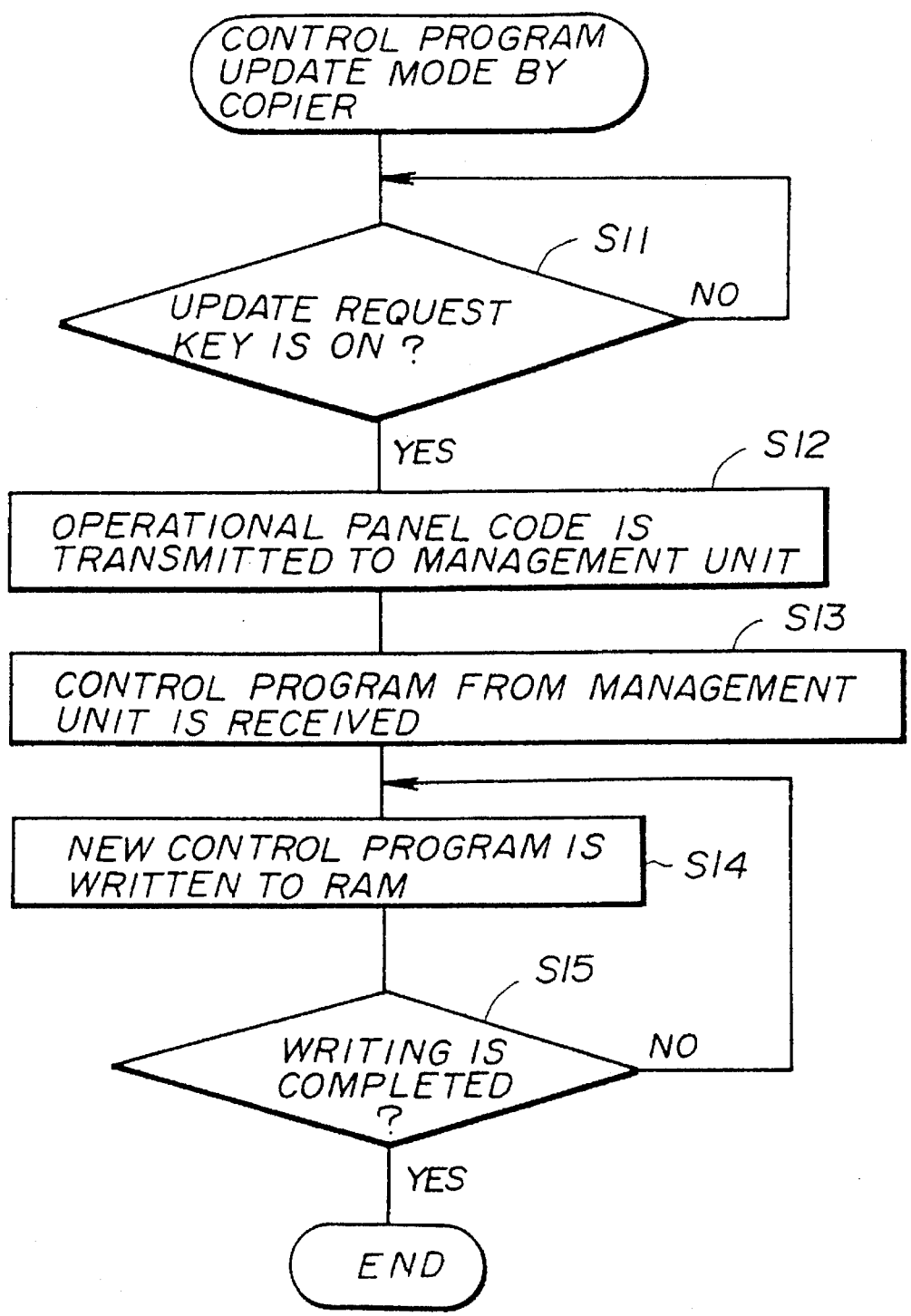
FIG. 12 is a flow chart for explaining a control program update mode performed by the copier in FIG. 1.

FIG. 12 shows the control program update mode performed by the copier 300. The CPU 3001 of the copier 300, at step S11, detects whether or not the update request key has been turned ON. If the update request key is not turned ON, the step S11 is repeated and the control program update mode is not yet started.

If the result at step S11 is affirmative, step S12 transmits an operational panel code from the operational panel 310 to the management unit 3400 via the telephone line. At step S12, the CPU 3111 of the operational panel 310 reads out an operational panel code from the ROM 3113 and transfers the operational panel code to the copier 300. The operational panel code, read by the CPU 3111, includes the panel code, the screen size, and the copier code, as shown in FIG. 9. At step S12, the CPU 3001 of the copier 300 transmits an update mode signal and the operational panel code to the management unit 3400 via the telephone line 3302.

After the step S12 is performed, step S13 receives a new control program from the management unit 3400 via the telephone line 3302. A control program update procedure performed by the management unit 3400 after the step S12 and prior to the step S13 will be described later.

After the step S13 is performed, step S14 writes the new control program, received from the management unit 3400, to the RAM 3112 of the operational panel 310. Step S15 detects whether or not the writing process at step S14 is finished. If the writing process at step S14 is detected to be unfinished, the writing process at step S14 continues to run. If the writing process at step S14 is detected to be finished, the control program update mode in FIG. 12 ends. After the new control program is stored in the RAM 3112 of the operational panel 310, the operational panel 310 is controlled by the copier 300 in accordance with the new control program stored in the RAM 3112.

Figure 13:
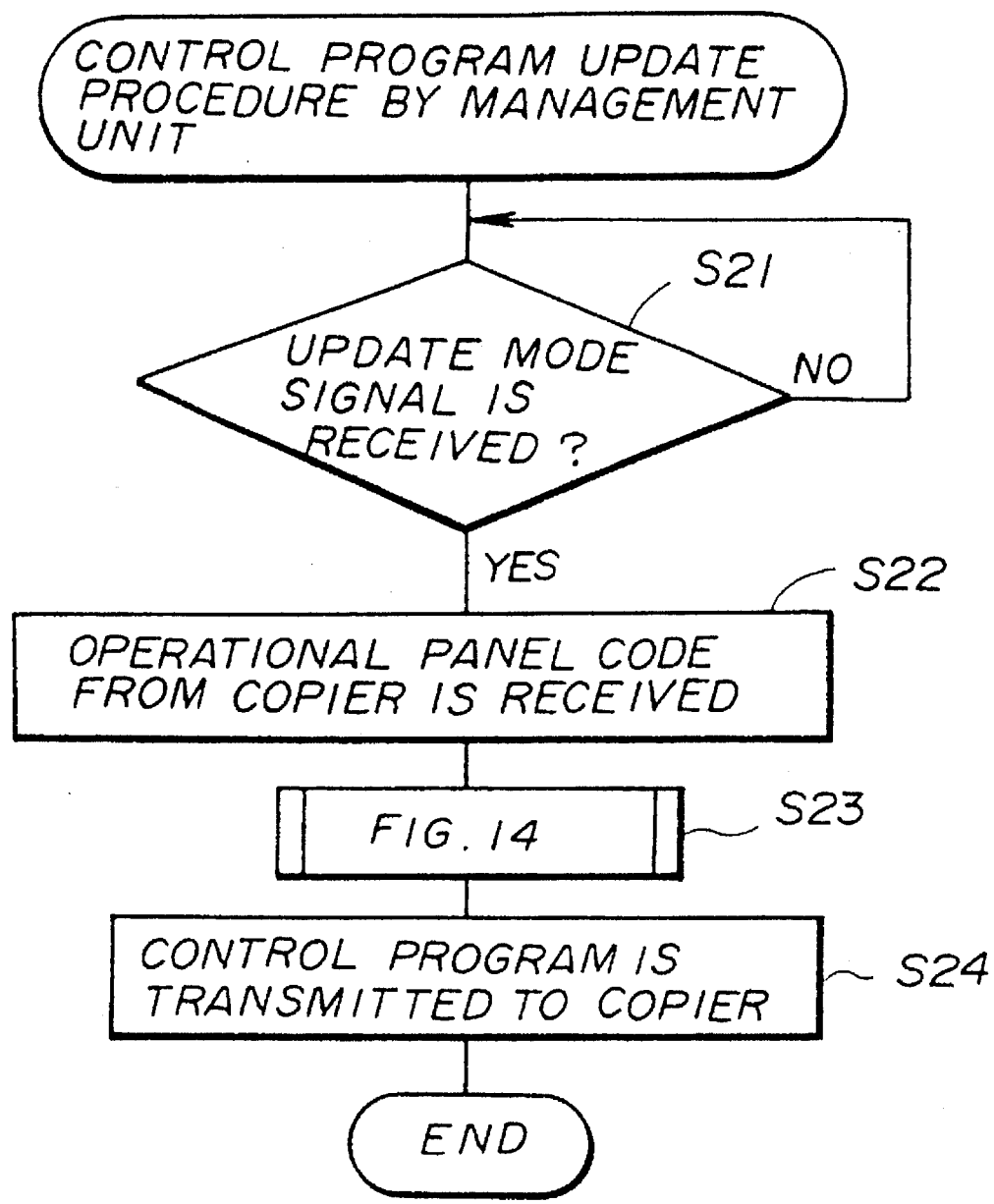
FIG. 13 is a flow chart for explaining a control program update procedure performed by the management unit in FIG. 1.

FIG. 13 shows a control program update procedure performed by the management unit 3400. This procedure is performed by the management unit 3400 after the operational panel code transmitting step S12 in FIG. 12 and prior to the update program receiving step S13 in FIG. 12, as described above.

At the start of the control program update procedure in FIG. 13, the host computer 3401 of the management unit 3400, at step S21, detects whether or not an update mode signal from the copier 300 has been received. If the update mode signal has not been received, the step S21 is repeated.

If the result at step S21 is affirmative, step S22 receives the operational panel code, supplied from the copier 300, through the modem 3403.

After the step S22 is performed, step S23 performs an operational panel code discriminating process in accordance with the received operational panel code. The operational panel code discriminating process at step S23 will be described below in more detail. At step S23, the host computer 3401 of the management unit 3400 discriminates the type of the operational panel 310, and read out a control program (the new control program) for the operational panel 310 suitable for the copier 300, from the ROM 3113 in accordance with the detected type of the operational panel 310.

After the step S23 is performed, step S24 performs a control program transmitting process in which the new control program from the management unit 3400 is transmitted to the copier 300 via the telephone line 3302. After the step S24 is performed, the control program update procedure in FIG. 13 ends.

Figure 14:
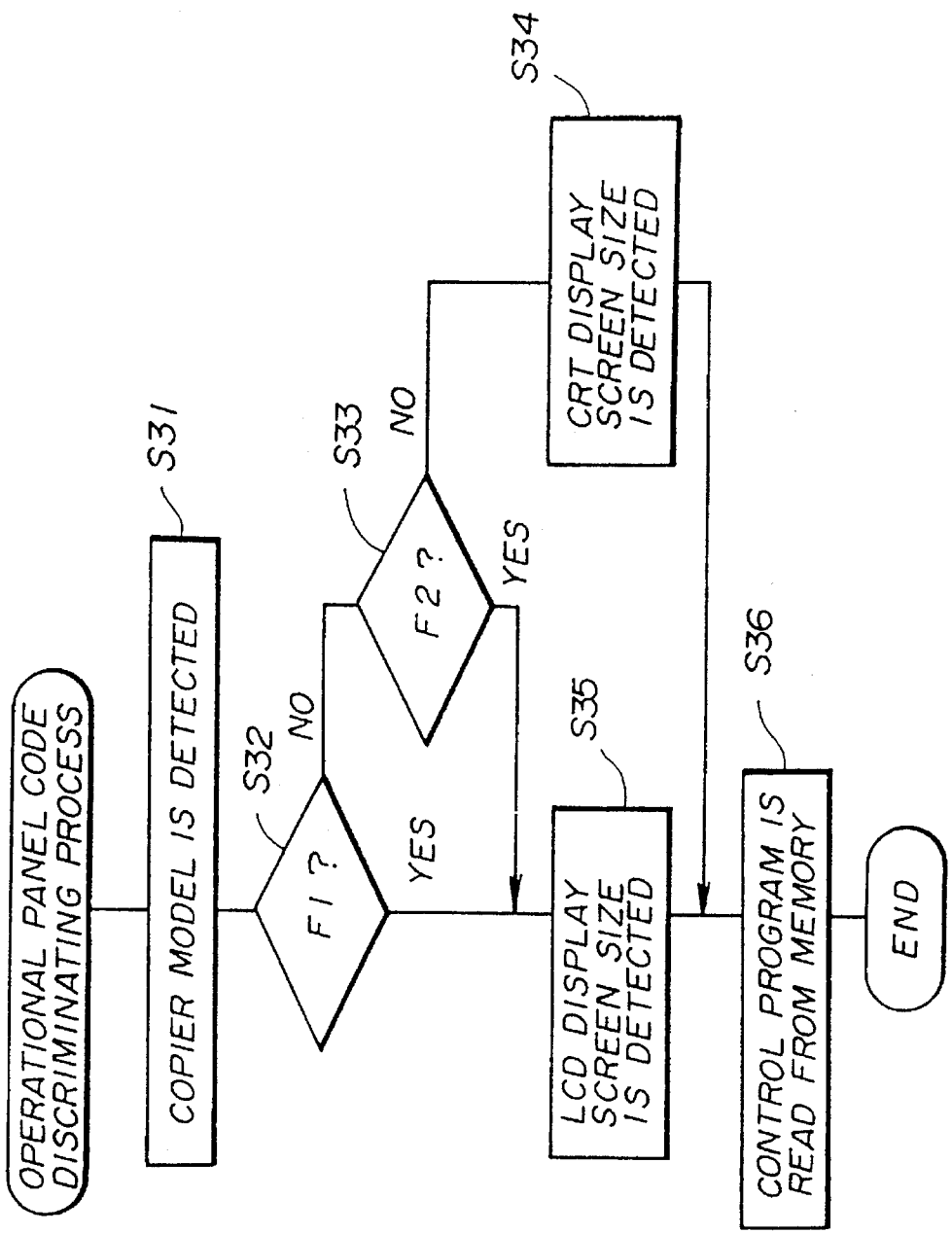
FIG. 14 is a flow chart for explaining an operational panel code discriminating process of the control program update procedure in FIG. 13.

FIG. 14 shows an operational panel code discriminating process performed by the management unit 3400. This process is performed at step S23 of the control program update procedure in FIG. 13, as described above.

At the start of the operational panel code discriminating process in FIG. 14, the host computer 3401 of the management unit 3400, at step S31, detects the model of the copier 300 in accordance with the received operational panel code.

After the step S31 is performed, step S32 detects whether or not the panel code, indicated by the received operational panel code, is "F1". As shown in FIG. 9, "F1" indicates an operational panel having a character type LED + LCD display.

If the result at step S32 is affirmative, the type of the operational panel 310 is detected to be an operational panel having a character type LED + LCD display, and them step S35 is performed. Step S35 detects the size of the LCD display screen of the current operational panel 310 in accordance with the received operational panel code.

On the other hand, if the result at step S32 is negative, step S33 is performed. Step S33 detects whether or not the panel code, indicated by the received operational panel code, is "F2". As shown in FIG. 9, "F2" indicates an operational panel having a full-dot type LED + LCD display.

If the result at step S33 is affirmative, the type of the operational panel is detected to be an operational panel having a full-dot type LED + LCD display, and then the above step S35 is performed.

On the other hand, if the result at step S33 is negative, it is determined that the type of the operational panel 310 is "F3" and then step S34 is performed. As shown in FIG. 9, "F3" indicates an operational panel having an LCD + CRT display. Step S34 detects the size of the CRT display screen of the current operational panel 310 in accordance with the received operational panel code.

After either the step S35 or the step S34 is performed, step S36 is performed. Step S36 reads out a control program (the new control program) for the operational panel 310 suitable for the copier 300, from the memory 3402 in accordance with the detected copier code, the detected panel code, and the detected screen size. The read control program, obtained at step S36, is the new control program that is transmitted from the management unit 3400 to the copier 300 via the telephone line 3302 at step S24 of the control program procedure in FIG. 13.

Next, a description will be given of a control program update procedure performed by a communication system in the second embodiment of the present invention. In the communication system in the second embodiment, a procedure similar to the control program update mode shown in FIG. 12 is performed by the copier, and a modified control program update procedure is performed by the management unit wherein the control program update procedure shown in FIG. 13 is modified.

By performing the control program update procedure in the second embodiment, an optimum display message, supplied from the management unit in response to the ON state of the update request key on the copier 300, is displayed on the operational panel 310 of the copier 300, the optimum display message indicating the size of an optimum display screen for the operational panel 310 of the copier 300. After a response to the optimum display message is transmitted from the copier 300 to the management unit 3400, the previous control program is updated with a new control program from the management unit 3400. As described above, various control programs for controlling operational panels of different types are stored in the memory 3402 of the management unit 3400. Various optimum display messages for operational panels of different copier models are further stored in the memory 3402 of the management unit 3400 in the second embodiment.

Before the start of the control program update procedure in the second embodiment, it is assumed that an operational panel 310, detached from the previous copier (not shown), is attached to the copier 300 to re-use the operational panel 310 thereon. When an update request key of the operational panel 310 is turned ON, the control program update procedure is started.

Similarly to the control program update procedure in FIG. 13, at the start of the control program update procedure, the management unit 3400 receives an update request signal and the operational panel code from the copier 300 via the telephone line. The host computer 3401 of the management unit 3400 detects whether or not the operational panel 310 is an optimum operational panel for the copier 300, in accordance with the panel code and the copier code both indicated by the received operational panel code.

When the operational panel 310 is detected to be different from the optimum operational panel for the copier 300, the host computer 3401 of the management unit 3400 reads out data of the optimum operational panel from the memory 3402 in accordance with the received operational panel code, and transmits the read data to the copier 300 via the telephone line 3302.

For example, the operational panel 310, attached to the copier 300 in order to re-use it thereon, is provided with a 320×200 LCD display, and the optimum operational panel for the copier 300 is an operational panel having a 400×256 LCD display. The management unit 3400 transmits an optimum display message, indicating that the optimum operational panel for the copier 300 includes a 400×256 LCD display, to the copier 300 via the telephone line 3302.

In the above mentioned case, the optimum display message, supplied from the management unit 3400, is displayed on the LCD display of the operational panel 310 of the copier 300. An operator or a maintenance person determines whether or not the current operational panel 310, which is not the optimum operational panel for the copier 300, is used for the copier 300. After the determination is made, he inputs a response to the optimum display message on the LCD display of the operational panel 310. When an affirmative response, indicating that the current operational panel is used, is transmitted to the management unit 3400. The management unit 3400 reads out a control program (the new control program) for the operational panel 310 suitable for the copier 300, from the memory 3402 in accordance with the received operational panel code, and transmits the read control program to the copier 300 via the telephone line 3302. Then, the new control program is stored in the RAM 3112 of the operational panel 310 and the operational panel 310 is used.

When a negative message, indicating that the current operational panel is not used, is input by the operator, it is necessary that a different operational panel is attached to the copier 300 and a control program update request is performed.

Figure 15:
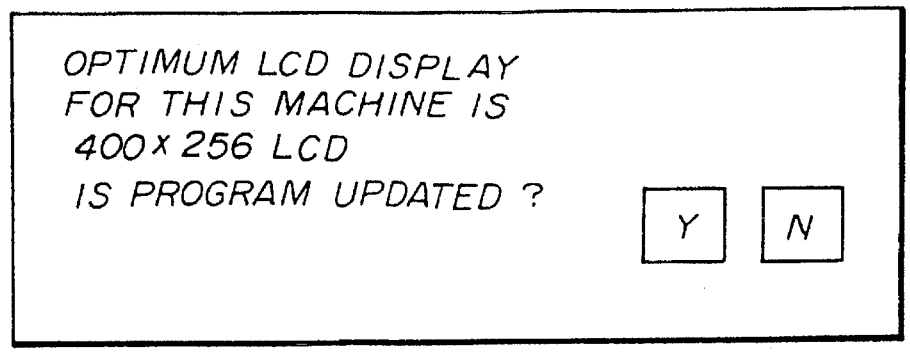
FIG. 15 is a diagram showing an example of an optimum display message which indicates the size of an optimum display screen for an operational panel.

FIG. 15 shows an example of an optimum display message which indicates the size of an optimum display screen for an operational panel. When the operator inputs the affirmative response to this message on the operational panel (or the key "Y" being pressed), a control program is updated and the operational panel is used for the copier. On the other hand, when the operator inputs the negative response to this message, a control program is not used for the copier and the control program update procedure ends.

Figure 16:
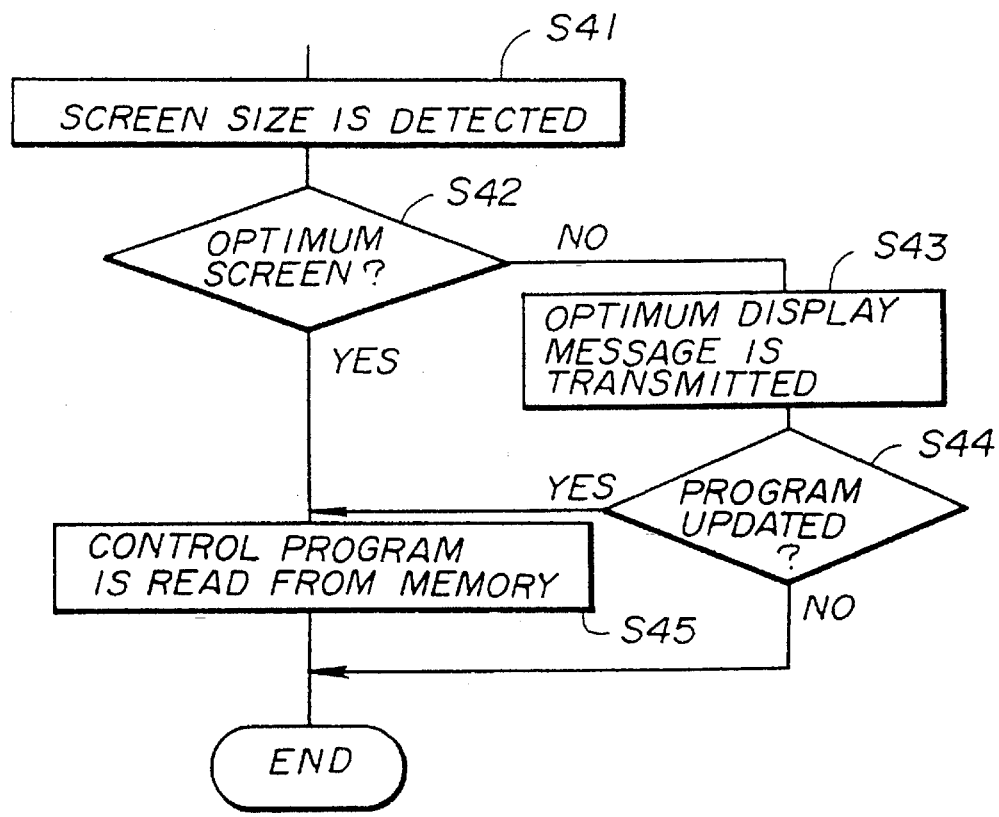
FIG. 16 is a flow chart for explaining an optimum display message procedure performed by the management unit in the second embodiment of the present invention.

FIG. 16 shows an optimum display message procedure performed by the management unit 3400 in the second embodiment. In the optimum display message in FIG. 16, step S41 detects the screen size indicated by the received operational panel code. After the step S41 is performed, step S42 detects whether or not the current operational panel 310 is an optimum operational panel for the copier 300, in accordance with the received operational panel code.

When the result at step S42 is affirmative, step S45 is performed. Step S45 reads out a control program (the new control program) for the operational panel 310 suitable for the copier 300, from the memory 3402 in accordance with the detected copier code, the detected panel code, and the detected screen size. The control program, obtained at step S45, is the new control program that is transmitted from the management unit 3400 to the copier 300 via the telephone line 3302 in a control program update procedure.

On the other hand, when the result at step S42 is negative, step S43 is performed. Step S43 transmits an optimum display message from the management unit 3400 to the copier 300 via the telephone line 3302. This message is, for example, the optimum display message shown in FIG. 15, and it is displayed on the current operational panel 310. After the step S43 is performed, step S44 detects whether or not the operator on the copier 300 has input an affirmative response to the optimum display message.

When the result at step S44 is affirmative, the operator on the copier 300 has input an affirmative response, and the step S45 is performed. When the result at step S44 is negative, the optimum display message procedure in FIG. 16 ends and the step S45 is not performed.

Next, a description will be given of a control program update procedure performed by a communication system in the third embodiment of the present invention. In the communication system in the third embodiment, a procedure similar to the control program update mode shown in FIG. 12 is performed by the copier, and a modified control program update procedure is performed by the management unit wherein the control program update procedure shown in FIG. 13 is modified.

By performing the control program update procedure in the third embodiment, an alarm message, supplied from the management unit 3400 in response to the ON state of the update request key on the copier 300, is displayed on the operational panel 310 of the copier 300. The alarm message is displayed when a control program for the operational panel 310 suitable for the copier 300 is not found in the memory 3402 of the management unit 3400. In addition to various control programs for controlling operational panels of different types, various alarm messages for the operational panel of different types are stored in the memory 3402 of the management unit 3400.

Figure 17:
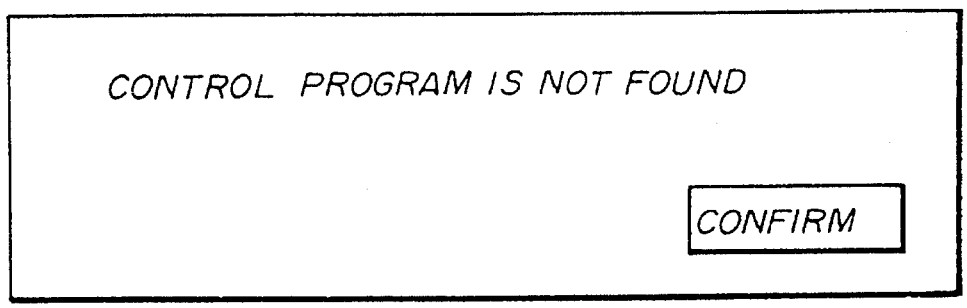
FIG. 17 is a diagram showing an alarm message which indicates that the management unit has no control program to be updated.

FIG. 17 shows an example of an alarm message which indicates that the management unit has no control program to be updated. As the alarm message, supplied from the management unit, is displayed on the operational panel of the copier, whether or not the control program to be updated is stored in the management unit is informed to an operator or a maintenance person on the copier.

Figure 18:
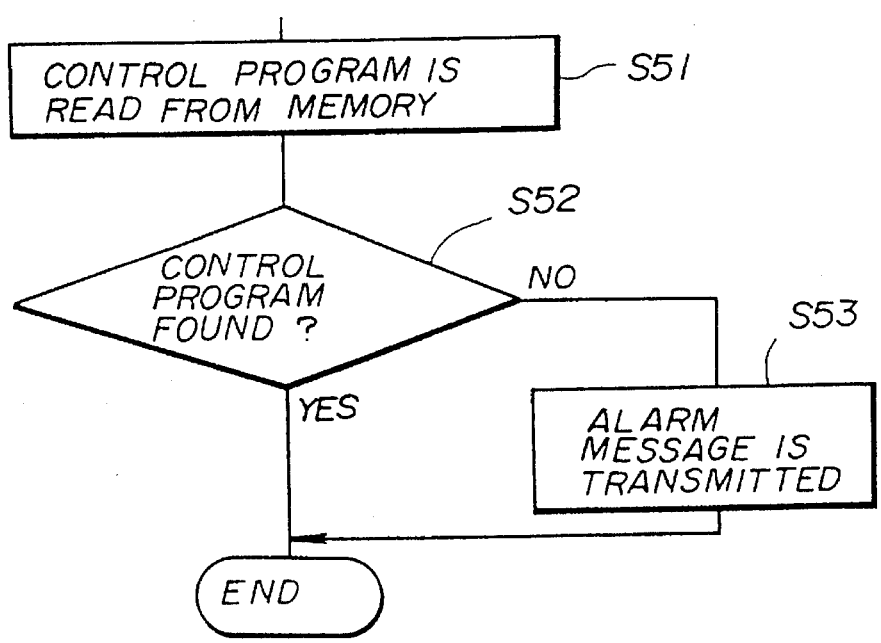
FIG. 18 is a flow chart for explaining an alarm message transmitting procedure performed by the management unit in the third embodiment of the present invention.

FIG. 18 shows an alarm message transmitting procedure performed by the management unit in the third embodiment. In the alarm message transmitting procedure in FIG. 18, step S51 reads out a control program (the new control program) for the operational panel 310 suitable for the copier 300 from the memory 3402 in accordance with the received operational panel code. Step S52 detects whether or not the control program is found in the memory 3402 of the management unit 3400.

When the result at step S52 is affirmative, the alarm message transmitting procedure in FIG. 18 ends. On the other hand, when the result at step S52 is negative, step S53 is performed. Step S53 transmits an alarm message from the management unit 3400 to the copier 300 via the telephone line 3302. After the step S53 is performed, the alarm message transmitting procedure in FIG. 18 ends.

Next, a description will be given of a control program update procedure performed by a communication system in the fourth embodiment of the present invention. In the communication system in the fourth embodiment, a procedure similar to the control program update mode shown in FIG. 12 is performed by the copier, and a modified control program update procedure is performed by the management unit wherein the control program update procedure shown in FIG. 13 is modified.

By performing the control program update procedure in the fourth embodiment, a combined message, supplied from the management unit 3400 in response to the ON state of the update request key on the copier 300, is displayed on the operational panel 310 of the copier 300. The combined message includes an alarm message and an allowed operational panel message. The combined message is displayed when a control program for the operational panel 310 suitable for the copier 300 is not found in the memory 3402 of the management unit 3400. In addition to various control programs for controlling operational panels of different types, various combined messages for the operational panels of different types are stored in the memory 3402 of the management unit 3400.

Figure 19:
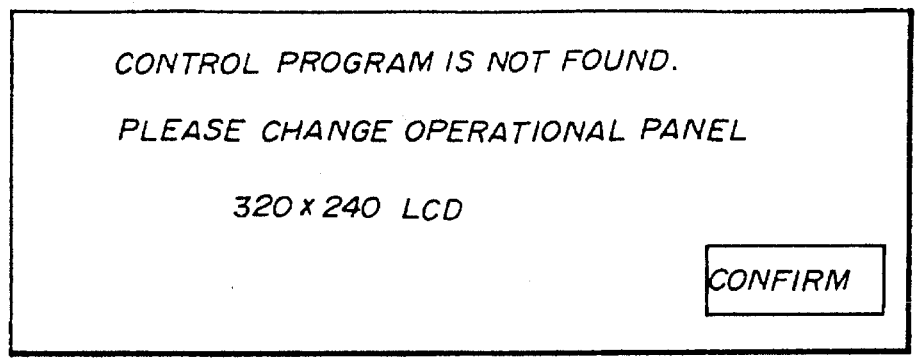
FIG. 19 is a diagram showing a combined message which is transmitted by the management unit in the fourth embodiment.

FIG. 19 shows an example of a combined message which is transmitted by the management unit to the copier in the fourth embodiment of the present invention. The combined message indicates that the management unit has no control program to be updated, and indicates what is the allowed operational panel for the copier. As the combined message supplied from the management unit is displayed on the operational panel of the copier, whether or not the control program to be updated is stored in the management unit is informed to an operator or a maintenance person on the copier. In addition, the operator on the copier can get the information as to what the allowed operational panel for the copier is.

Figure 20:
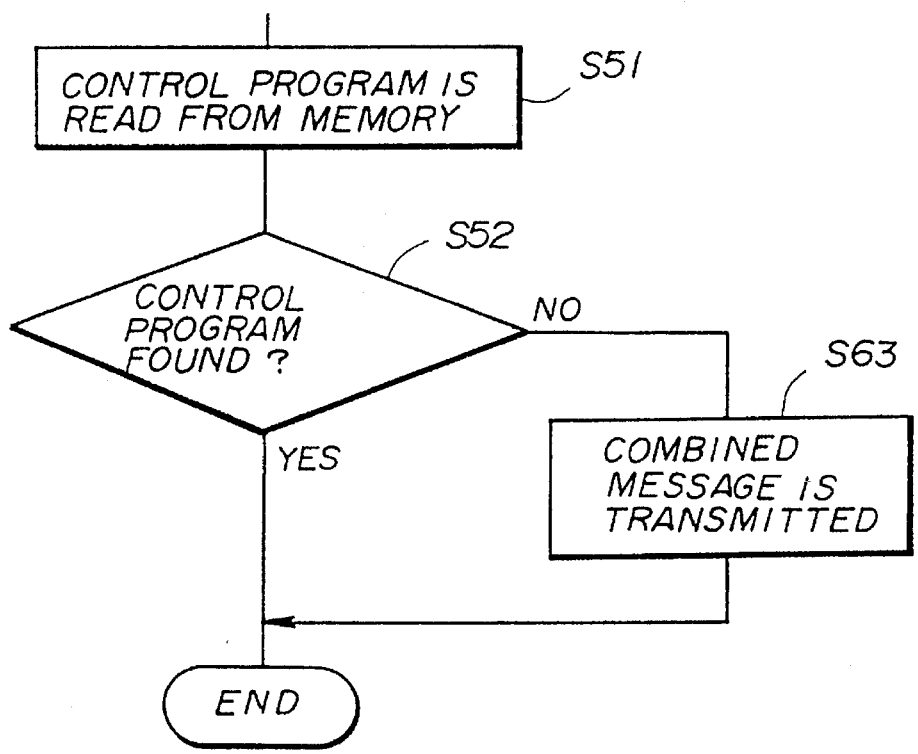
FIG. 20 is a flow chart for explaining a combined message transmitting procedure performed by the management unit in the fourth embodiment.

FIG. 20 shows a combined message transmitting procedure performed by the management unit in the fourth embodiment. In FIG. 20, the steps which are the same as the corresponding steps in FIG. 18 are designated by the same reference numerals.

In the combined message transmitting procedure in FIG. 20, the step S51 reads out a control program for the operational panel 310 suitable for the copier 300 from the memory 3402 in accordance with the received operational panel code. Step S52 detects whether or not the control program is found in the memory 3402 of the management unit 3400.

When the result at step S52 is affirmative, the combined message transmitting procedure in FIG. 20 ends. On the other hand, when the result at step S52 is negative, step S63 is performed. Step S63 transmits a combined message from the management unit 3400 to the copier 300 via the telephone line 3302. The combined message transmitted at step S63 is, for example, the combined message shown in FIG. 19 wherein it includes the alarm message and the allowed operational panel message, and it is displayed on the operational panel 310. After the step S53 is performed, the combined message transmitting procedure in FIG. 20 ends.

Next, a description will be given of a control program update procedure performed by a communication system in the fifth embodiment of the present invention. In the communication system in the fifth embodiment, a procedure similar to the control program update mode shown in FIG. 12 is performed by the copier, and a modified control program update procedure is performed by the management unit wherein the control program update procedure shown in FIG. 13 is modified.

Figure 21:
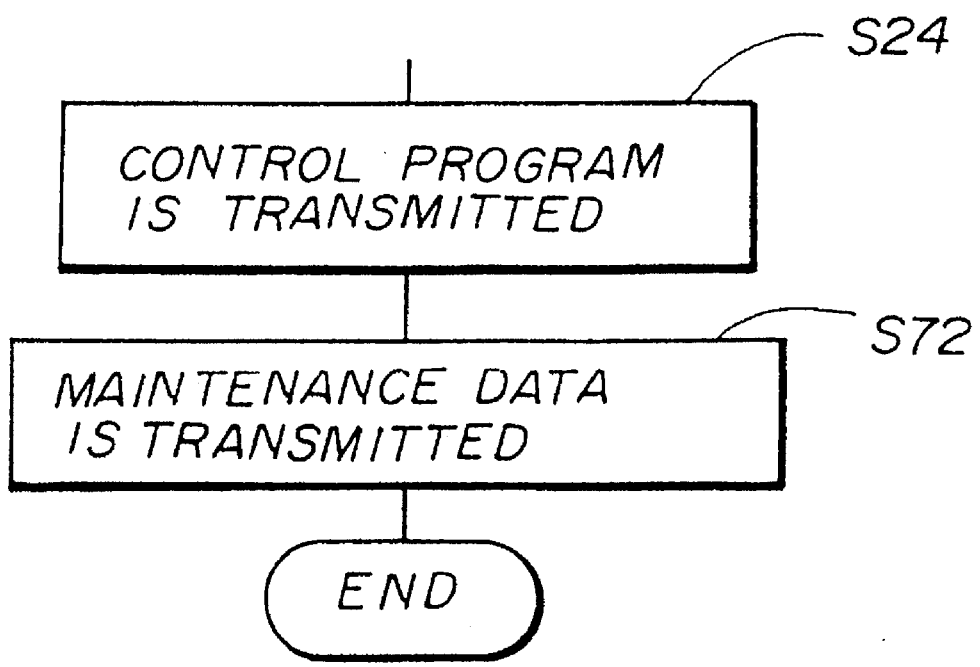
FIG. 21 is a flow chart for explaining a maintenance data transmitting procedure performed by the management unit in the fifth embodiment.

FIG. 21 shows a maintenance data transmitting procedure performed by the management unit in the fifth embodiment. In FIG. 21, the step which is the same as the corresponding step in FIG. 13 is designated by the same reference numeral.

In the maintenance data transmitting procedure in FIG. 21, the host computer 3401 of the management unit 3400, at step S24, transmits a control program, read from the memory 3402 of the management unit 3400, to the copier 300 via the telephone line 3302. The control program is stored in the RAM 3112 of the operational panel 310 of the copier 300. After the step S24 is performed, step S72 transmits maintenance data, read from the memory 3402 of the management unit 3400, to the copier 300 via the telephone line 3302.

The maintenance data stored in the memory 3402 of the maintenance unit 3400 includes the number of re-uses of the operational panel 310 and the date of the first re-use of the operational panel 310. The maintenance data supplied to the copier 300 is displayed on the operational panel 310 of the copier 300. Thus, the operator can get the records relating to the re-uses of the operational panel 310 from the maintenance data displayed on the operational panel 310.

Next, a description will be given of a control program update procedure performed by a communication system in the sixth embodiment of the present invention. In the communication system in the sixth embodiment, the operational panel 410 in FIG. 5 is used for the copier 300, and the control program update procedure is performed when the CPU 3001 of the copier 300 is set to a user program mode. By performing the control program update procedure, a program charge message is transmitted by the management unit 3400 to the copier 300 via the telephone line 3302, the program charge message informing the operator on the copier that a charge for updating the control program is necessary.

Figure 22A:
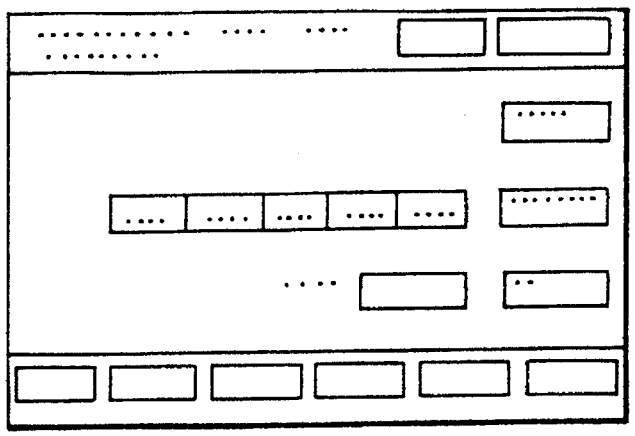
FIGS. 22A through 22C are diagrams showing images which are displayed on the operational panel of the copier when a control program update procedure is performed by the management unit in the sixth embodiment.
Figure 22B:
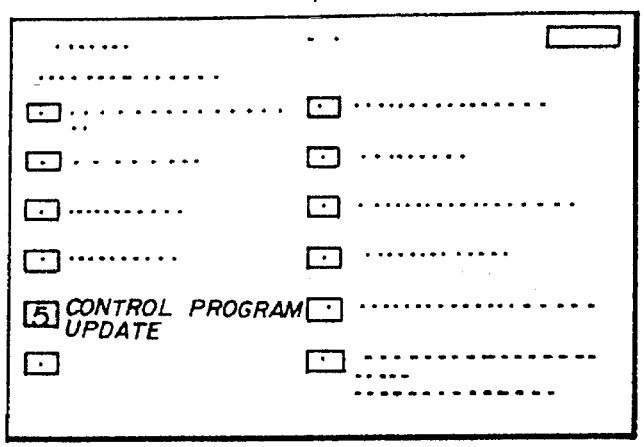
Figure 22C:
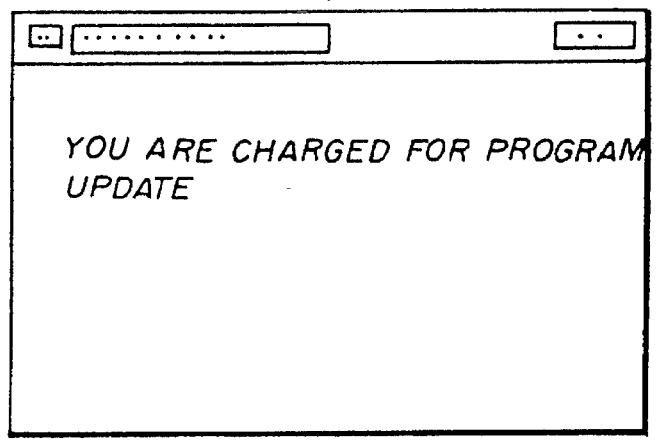

FIGS. 22A through 22C show images which are displayed on the operational panel of the copier when the control program update procedure is performed by the management unit in the sixth embodiment.

At the start of the control program update procedure in the sixth embodiment, the operational panel 410 in FIG. 5 is attached to the copier 300, and the CPU 3001 of the copier 300 is set to a user program mode. When a mode clear key on the touch panel 411 of the operational panel 410 is turned ON, the initial image in FIG. 22A appears on the display screen of the operational panel 410. The operator enters his password by depressing some of the numeric keys 412, and then the copier setting image in FIG. 22B appears on the display screen of the operational panel 410 instead of the initial image. When the operator enters the control program update item, as his choice, from among various setting items listed in the copier setting image, the program charge message in FIG. 22C appears on the display screen of the operational panel 410 instead of the copier setting image. When the operator inputs an acknowledgement (an affirmative response) in response to the program charge message, the control program update procedure is started.

Next, a description will be given of a control program update procedure performed by a communication system in the seventh embodiment of the present invention. In the communication system in the seventh embodiment, a procedure similar to the control program update mode shown in FIG. 12 is performed by the copier, and a modified control program update procedure is performed by the management unit wherein the control program update procedure shown in FIG. 13 is modified.

Figure 23:
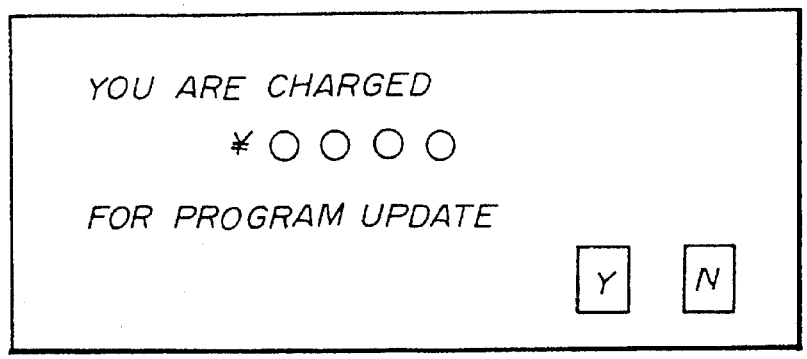
FIG. 23 is a diagram showing an example of a program charge message which is transmitted by the management unit in the seventh embodiment.

FIG. 23 shows an example of a program charge message which is transmitted by the management unit in the seventh embodiment. The program charge message indicates that a predetermined amount of a program charge is necessary for updating the control program. The program charge includes a control program update payment and a control program transmission payment.

Figure 24:
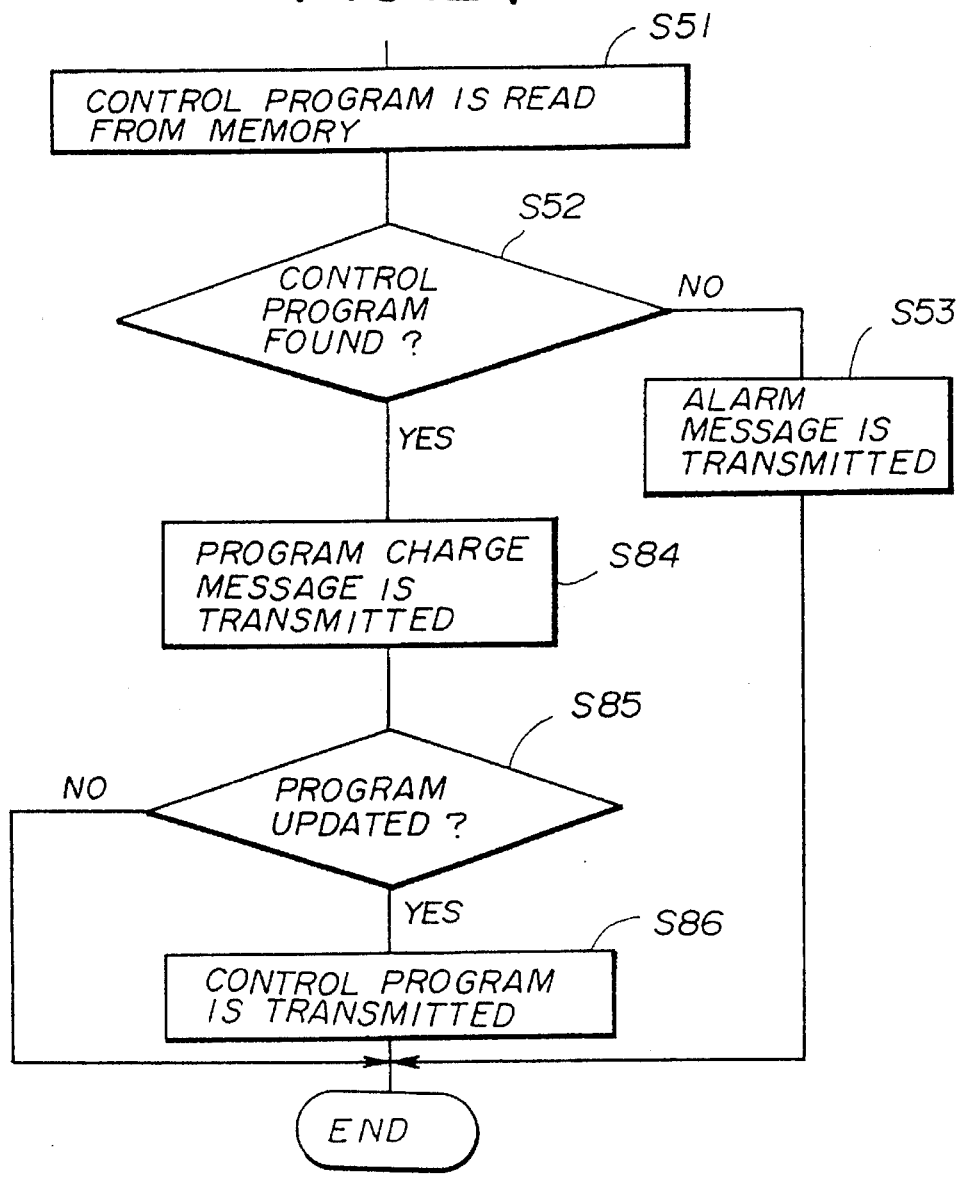
FIG. 24 is a flow chart for explaining a control program update procedure performed by the management unit in the seventh embodiment.

FIG. 24 shows the control program update procedure performed by the management unit in the seventh embodiment. In FIG. 24, the steps which are the same as the corresponding steps in FIG. 18 are designated by the same reference numerals.

In the control program update procedure in FIG. 24, the host computer 3401 of the management unit 3400, at step S51, reads out a control program for the operational panel 310 suitable for the copier 300 from the memory 3402 in accordance with the received operational panel code. Step S52 detects whether or not the control program is found in the memory 3402 of the management unit 3400.

When the result at step S52 is affirmative, step S84 is performed. Step S84 transmits a program charge message, read from the memory 3402 of the management unit 3400, to the copier 300 via the telephone line 3302. The program charge message transmitted at step S84 is, for example, the program update message shown in FIG. 23, and it is displayed on the operational panel 310 of the copier 300. After the step S84 is performed, step S85 is performed. Step S85 detects whether or not a response to the program charge message, which has been input by the operator on the copier 300, is affirmative. When the result at step S85 is negative, the operator has input a negative response. The control program update procedure in FIG. 24 ends. When the result at step S86 is affirmative, the operator has input an affirmative response and step S86 is performed. Step S86 transmits, the control program, read from the memory 3402 of the management unit 3400, to the copier 300 via the telephone line 3302. After the step S86 is performed, the control program update procedure in FIG. 24 ends.

On the other hand, when the result at step S52 is negative, step S53 is performed. Step S63 transmits an alarm message, read from the management unit 3400, to the copier 300 via the telephone line 3302. The alarm message transmitted at step S53 is displayed on the operational panel 310. After the step S53 is performed, the control program update procedure in FIG. 24 ends.

Next, a description will be given of a control program update procedure performed by a communication system in the eighth embodiment of the present invention. In the communication system in the fifth embodiment, a procedure similar to the control program update mode shown in FIG. 12 is performed by the copier, and a modified control program update procedure is performed by the management unit wherein the control program update procedure shown in FIG. 13 is modified.

When the control program update procedure is performed, a control program list, read from the memory of the management unit, is transmitted by the management unit to the copier via the telephone line. FIG. 25 shows an example of the control program list which is transmitted by the management unit in the eighth embodiment. As the control program list including various control program options suitable for the operational panel of the copier is displayed on the operational panel of the copier, the operator can select a desired control program from among the control programs of the control program list. When the desired control program is selected by the operator, the data of the selected control program from the copier is transmitted to the management unit. The selected control program, read from the memory of the management unit, is transmitted to the copier via the telephone line. Thus, the operator can update the control program of the operational panel to a desired control program among those of the control program list.

Further, the present invention is not limited to the above described embodiments, and variations and modifications may be made without departing from the scope of the present invention.

What is claimed is:

1. A communication system comprising:

an image forming unit connected to a communication line through a communication control unit; and a management unit for managing data of resources of said image forming unit, said management unit being connected to the communication line, said image forming unit comprising:

at least one component part;

first storage means for storing a control program for said at least one component part, so that said at least one component part is controlled in accordance with said control program; and first control means for transmitting a first code to said management unit via the communication line in response to an update request signal, said first code indicating a model of said image forming unit and indicating a type of said at least one component part, said management unit comprising:

second storage means for storing a plurality of control programs for different types of said at least one component part of said image forming unit; and second control means for reading out a first control program from said second storage means in accordance with said first code received from said first control means, and for transmitting said first control program to said image forming unit via the communication line, so that said first control program is stored in said first storage means.

2. A communication system according to claim 1, wherein a plurality of optimum display messages for component parts of different models of the image forming unit are further stored in said second storage means of said management unit, and said second control means of said management unit reads out one of said optimum display messages from said second storage means in accordance with said first code, and transmits the read optimum display message to said image forming unit via the communication line before said first control program is read out from said second storage means.

3. A communication system according to claim 1, wherein a control program list including a plurality of control program options for said at least one component part of said image forming unit is further stored in said second storage means, and said second control means reads out the control program list from said second storage means in accordance with said first code, and transmits the control program list to said image forming unit via the communication line before said first control program is read out from said second storage means.

4. A communication system according to claim 1, wherein said at least one component part of said image forming unit is an operational panel, and said operational panel is controlled in accordance with a control program stored in said first storage means of said image forming unit.

5. A communication system according to claim 1, wherein said management unit further comprises means for transmitting an alarm message to said image forming unit via the communication line when said first control program is not found in said second storage means by said second control means.

6. A communication system according to claim 1, wherein said management unit further comprises means for transmitting a combined message to said image forming unit via the communication line when said first control program is not found in said second storage means by said second control means, said combined message including an alarm message and an allowed component part message.

7. A communication system according to claim 1, wherein said management unit further comprises means for transmitting maintenance data of said at least one component part to said image forming unit via the communication line after said first control program is transmitted to said image forming unit by said second control means.

8. A communication system according to claim 1, wherein said management unit further comprises means for transmitting a program charge message to said image forming unit via the communication line after said first control program is read out from said second storage means by said second control means, so that said program charge message is displayed on said image forming unit.

9. A communication system according to claim 8, wherein said program charge message indicates that a predetermined amount of a program charge is necessary for updating a control program for said at least one component part.

* * * * *